United States Patent
Slattery et al.

(10) Patent No.: US 6,514,085 B2
(45) Date of Patent: *Feb. 4, 2003

(54) METHODS AND APPARATUS FOR COMPUTER BASED TRAINING RELATING TO DEVICES

(75) Inventors: Terrance C. Slattery, Annapolis, MD (US); Shawn G. Coville, Manassas, VA (US)

(73) Assignee: Element K Online LLC, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/365,243

(22) Filed: Jul. 30, 1999

(65) Prior Publication Data

US 2002/0072048 A1 Jun. 13, 2002

(51) Int. Cl.[7] .................................................. G09B 7/00
(52) U.S. Cl. ........................ 434/335; 434/219; 434/350; 434/118
(58) Field of Search ................................ 434/350, 322, 434/323, 219, 220, 221, 222, 223, 224, 118, 262, 335

(56) References Cited

U.S. PATENT DOCUMENTS

| | | | | |
|---|---|---|---|---|
| 4,295,831 A | * | 10/1981 | Matt | 434/118 |
| 4,609,358 A | * | 9/1986 | Sangster | 434/307 X |
| 4,652,240 A | * | 3/1987 | Wackym | 434/118 X |
| 4,715,818 A | * | 12/1987 | Shapiro et al. | 434/118 X |
| 4,785,472 A | * | 11/1988 | Shapiro | 379/93.19 X |
| 4,798,543 A | | 1/1989 | Spiece | |
| 4,909,739 A | | 3/1990 | Ladner et al. | |
| 5,170,362 A | * | 12/1992 | Greenberg et al. | 700/90 |

(List continued on next page.)

OTHER PUBLICATIONS

Application Ser. No. 09/364,045, Applicant: T. Slattery et al, Filed: Jul. 30, 1999, Title: Methods and Apparatus for a User Interface for Computer Based Training Relating to Devices.
Application Ser. No. 09/364,046, Applicant: T. Slattery et al, Filed: Jul. 30, 1999, Title: Methods and Apparatus for a Learning Structure in Computer Based Training Relating to Devices.
Application Ser. No. 09/364,047, Applicant: T. Slattery et al, Filed: Jul. 30, 1999, Title: Methods and Apparatus for a Virtual Classroom.
Application Ser. No. 09/364,048, Applicant: T. Slattery et al, Filed: Jul. 30, 1999, Title: Methods and Apparatus for Computer Based Assessment Relating to Devices.
Application Ser. No. 09/540,401, Applicant: J. Boney et al, Filed: Mar. 31, 2000, Title: Methods and Apparatus for Computer Training Relating to Devices Using a Resource Control Module.

Primary Examiner—Joe H. Cheng
Assistant Examiner—Chanda Harris
(74) Attorney, Agent, or Firm—Nixon Peabody LLP

(57) ABSTRACT

Methods and Systems for training a user regarding controlling a device. Through these methods and systems a user may remotely access a device in order to perform an assignment or task designed to train the user in the operation of the device. The user is able to access the devices through a user computer that is remotely connected to a pod controller. This connection may traverse a Internet or Intra-net, or it may be a direct connection. The pod controller receives device control information sent from the user and translates it so it can be directly fed into the device, thus, providing the user with actual control over the device.

56 Claims, 34 Drawing Sheets

U.S. PATENT DOCUMENTS

| | | | |
|---|---|---|---|
| 5,782,642 A | * 7/1998 | Goren | 434/307 R |
| 5,823,781 A | * 10/1998 | Hitchcock et al. | 434/118 X |
| 5,823,788 A | * 10/1998 | Lemelson et al. | 434/350 X |
| 5,870,768 A | 2/1999 | Hekmatpour | |
| 5,882,206 A | * 3/1999 | Gillio | 434/262 |
| 5,915,973 A | * 6/1999 | Hoehn-Saric | 434/350 X |
| 5,920,838 A | 7/1999 | Mostow et al. | |
| 5,991,693 A | 11/1999 | Zalewski | |
| 6,033,226 A | * 3/2000 | Bullen | 434/219 X |
| 6,041,343 A | 3/2000 | Nguyen et al. | |
| 6,064,856 A | * 5/2000 | Lee et al. | 434/350 X |
| 6,074,213 A | * 6/2000 | Hon | 434/262 X |
| 6,074,216 A | * 6/2000 | Cueto | 434/322 X |
| 6,099,317 A | 8/2000 | Bullwinkel et al. | |
| 6,099,320 A | 8/2000 | Papadopoulos | |
| 6,154,631 A | * 11/2000 | Remschel | 434/350 X |
| 6,157,808 A | 12/2000 | Bollingsworth | |
| 6,164,974 A | 12/2000 | Carlile et al. | |
| 6,193,519 B1 | 2/2001 | Eggert et al. | |
| 6,196,846 B1 | 3/2001 | Berger et al. | |
| 6,224,385 B1 | * 5/2001 | Nitta et al. | 434/219 X |

\* cited by examiner

1011. APPLETALK ROUTING

LOGOUT vLAB CONTROLS : RESET : SAVE : LOAD : CYCLE BREAK : EXIT CONSOLE 402  404  406  408

RETURN TO LOCKER

TIME REMAINING:

412 — LAB INFORMATION INSTRUCTIONS

414 — SCENARIO AND ASSIGNMENTS

416 — MENTORING

418 — VIEW PLAN

420 — SUGGESTED APPROACH

422 — SAMPLE SOLUTION

424 — CHECK RESULTS

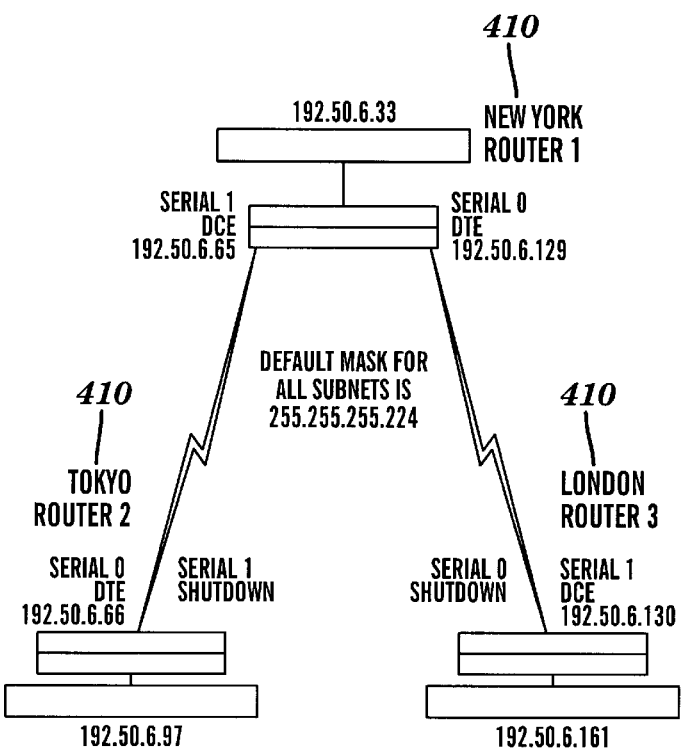

410 NEW YORK ROUTER 1 — 192.50.6.33
SERIAL 1 DCE 192.50.6.65
SERIAL 0 DTE 192.50.6.129
DEFAULT MASK FOR ALL SUBNETS IS 255.255.255.224
410 TOKYO ROUTER 2
SERIAL 0 DTE 192.50.6.66
SERIAL 1 SHUTDOWN
192.50.6.97
410 LONDON ROUTER 3
SERIAL 0 SHUTDOWN
SERIAL 1 DCE 192.50.6.130
192.50.6.161

CLICK ON A DEVICE ABOVE TO OPEN A CONSOLE SESSION

*FIG. 4*

702 — 1. NAME
- LAST NAME
- LAST NAME
- M.I.

704 — 2. ADDRESS
- COMPANY
- STREET
- CITY
- STATE

706 — 3. USER NAME

708 — 4. PASSWORD

*FIG. 7*

| scenario | Lab Highlights | Story | Conditions | Diagram |

1011. Appletalk Routing

Details ——— *1410*

| | |
|---|---|
| vLab Title | 1011. Appletalk Routing |
| Technology | Network Layer |
| Level of Difficulty | Basic |
| Time Required | 57 mins |
| Certification | CCNA |
| Desired Learner Outcomes | Experience designing and implementing Appletalk in a network. |
| Desired Network Outcomes | Appletalk routing is operational on the network. |

| Top

Assignment ——— *1420*
Design an Appletalk numbering plan and enable Appletalk routing

| Top

Story ——— *1430*
Your network manager has told you that your network will soon have to carry Appletalk traffic. In order for this to happen you must plan an Appletalk numbering scheme and assign Appletalk zone names for each of the segments in your network. You will also enable Appletalk routing on all of the active interfaces on your routers. Once Appletalk is enabled on the routers and configured on the interfaces, you should verify that Appletalk is functioning properly.

| Top

Conditions ——— *1440*
IP routing is already up and running on this network. DO NOT CHANGE ANY OF THE IP ROUTING CONFIGURATIONS.

Your Apple administrator has given you the following range of Appletalk network numbers, 2000-2999. You may use any number within that range to assign a unique Appletalk network number to each segment in the network. All of the serial links should be configured in the 'cereal zone'. You should make up unique zone names for each of the Ethernet interfaces.

| Top

Notes ——— *1450*
The serial links between routers are implemented via direct connections in this lab and do not actually connect through any leased line services for the serial links. Here is the existing IP network. Use this as a starting point to plan your Appletalk Network.

| Top

*FIG. 14A*

Suggested Approach
1011. Appletalk Routing

*Figure out the Appletalk numbering plan. Assign a unique Appletalk cable range to each network segment. Note the Appletalk zone names on each network. Enable Appletalk routing on the routers, then configure the appropriate Appletalk cable range on each active router interface. Once that is done verify proper Appletalk operation using show commands.*

Sample Solution

Plan Appletalk addressing —— *1602*

| HINT |—— *1604*

—— *1606*

Assign on paper a unique Appletalk network number to each network segment.

Action: Choose a cable range from the addresses that were given to you by the Appletalk administrator (2000-2999) for each network segment.

Result: Each 'wire' in the network should get a different Appletalk cable range.

Explanation: Appletalk routing requires that every segment (or wire) in the network have a unique cable range in order for the Appletalk protocol to identify each part (link) of the network. A cable range is a contiguous range of network numbers that is assigned to a network segment. An example of a cable range would be 2300-2310. This assigns the range of network numbers from 2300 to 2310 to the network segment. Once you have a completed diagram, note the interfaces that each link connects to.

Assign on paper Appletalk zone names to each network segment, and assign all of the serial links in the 'cereal zone'. —— *1606*

Action: You need to think up three additional unique zone names for each of the Ethernet segments.

Result: An Appletalk zone can cover more than one network segment. Each network segment must be in at least one Appletalk zone. Zones are alpha numeric names, spaces are legal characters. Router ports that connect to the same network segment must be configured identically.

Explanation: The sample diagram shows one possible way of assigning Appletalk cable ranges and zone names to the various links in the network.

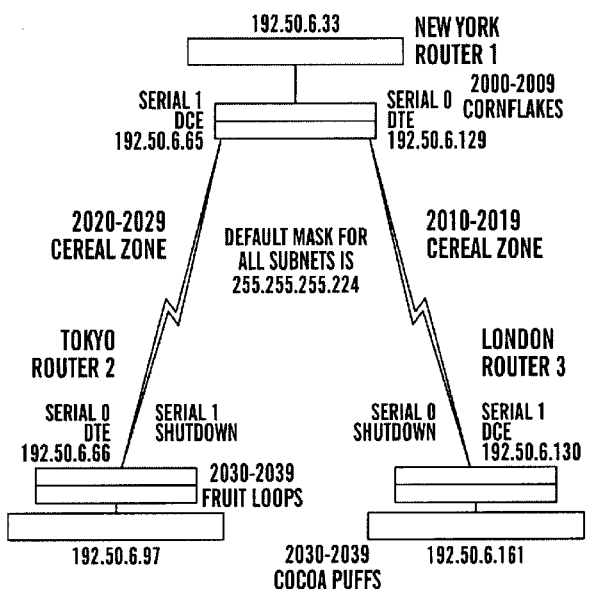

Enable Appletalk Routing on each router. ━━━1602

| HINT |━━1604

Start the Appletalk routing processes on the New York router. ━1606

| | |
|---|---|
| Action: | appletalk routing |
| Result: | NewYork>en |
| | NewYork#conf t |
| | Enter configuration commands, one per line. End with CNTL/Z. |
| | NewYork (config)#appletalk routing |
| | NewYork (config)#^Z |
| | NewYork# |
| | %SYS-5-CONFIG_I: Configured from console by console |
| Explanation: | The Appletalk routing process is not on by default. You must tell the router that you want it to route Appletalk packets. The "Appletalk routing" command also starts the Appletalk RTMP routing protocol running. |

Start the Appletalk routing processes on the Tokyo router. ━━1606

| | |
|---|---|
| Action: | appletalk routing |
| Result: | Tokyo>en |
| | Tokyo#conf t |
| | Enter configuration commands, one per line. End with CNTL/Z. |
| | Tokyo(config)#appletalk routing |
| | Tokyo(config)#^Z |
| | Tokyo# |
| | %SYS-5-CONFIG_I: Configured from console by console |
| Explanation: | The Appletalk routing process is not on by default. You must tell the router that you want it to route Appletalk packets. The "Appletalk routing" command also starts the Appletalk RTMP routing protocol running. |

Start the Appletalk routing processes on the London router. ━━1606

| | |
|---|---|
| Action: | appletalk routing |
| Result: | London>en |
| | London#conf t |
| | Enter configuration commands, one per line. End with CNTL/Z. |
| | London (config) #appletalk routing |
| | London (config) #^Z |
| | London# |
| | %SYS-5-CONFIG_I: Configured from console by console |
| Explanation: | The Appletalk routing process is not on by default. You must tell the router that you want it to route Appletalk packets. The "Appletalk routing" command also starts the Appletalk RTMP routing protocol running. |

Configure the proper Appletalk network number on each interface (Ethernet 0, Serial 0, and/or Serial 1) for the New York router using the diagram you made earlier.

Action:　　appletalk cable-range <cable range>
　　　　　　appletalk zone <zone name>

Result:　　New York#
　　　　　　%SYS-5-CONFIG_I: Configured from console by console
　　　　　　configure terminal
　　　　　　Enter configuration commands, one per line. End with CNTL/Z.
　　　　　　NewYork (config)#interface serial 0
　　　　　　NewYork (config-if) #appletalk cable-range 2010-1019
　　　　　　NewYork (config-if) #appletalk zone cereal zone
　　　　　　NewYork (config-if) #interface serial 1
　　　　　　NewYork (config-if) #appletalk cable-range 2020-2029
　　　　　　NewYork (config-if) #appletalk zone cereal zone
　　　　　　NewYork (config-if) #interface ethernet 0
　　　　　　NewYork (config-if) #appletalk cable-range 2000-2009
　　　　　　NewYork (config-if) #appletalk zone cornflakes
　　　　　　NewYork (config-if) #^Z
　　　　　　NewYork#
　　　　　　%SYS-5-CONFIG_I: Configured from console by console Explanation:　A unique Appletalk cable range must be assigned to each interface routing packets for the Appletalk protocol.

Configure the proper Appletalk network number on each Interface (Ethernet 0, Serial 0, and/or Serial 1) for the Tokyo router using the diagram you made earlier.

*1606*

Action:　　appletalk cable-range <cable range>
　　　　　　appletalk zone <zone name>

Result:　　Tokyo#conf t
　　　　　　Enter configuration commands, one per line. End with CNTL/Z
　　　　　　Tokyo (config) #int e 0
　　　　　　Tokyo (config-if) #appletalk cable-range 2030-2039
　　　　　　Tokyo (config-if) #appletalk zone fruit loops
　　　　　　Tokyo (config-if) #int s 0
　　　　　　Tokyo (config-if) #appletalk cable-range 2020-2029
　　　　　　Tokyo (config-if) #appletalk zone cereal zone
　　　　　　Tokyo (config-if) #^Z
　　　　　　Tokyo#
　　　　　　%SYS-5-CONFIG_I: Configured from console by console Explanation:　A unique Appletalk cable range must be assigned to each interface routing packets for the Appletalk protocol.

Configure the proper Appletalk network number on each interface (Ethernet 0, Serial 0, and/or Serial 1) for the London router using the diagram you made earlier.
↘ *1606*

Action: appletalk cable-range <cable range>
appletalk zone <zone name>

Result: London#conf t
Enter configuration commands, one per line. End with CNTL/Z
London (config) #int e 0
London (config-if) #appletalk cable-range 2040-2049
London (config-if) #appletalk zone cocoa puffs
London (config-if) #int s 1
London (config-if) #appletalk cable-range 2010-2019
London (config-if) #appletalk zone cereal zone
London (config-if) #^Z
London#
%SYS-5-CONFIG_I: Configured from console by console Explanation: A unique Appletalk cable range must be assigned to each interface routing packets for the Appletalk protocol.

Verify Proper Operation of Appletalk Routing ——— *1602*

| HINT | ——— *1604*

Use a brief version of a show command to see that the Appletalk protocol is properly configured and running on the New York router. ——— *1606*

Action: show appletalk interface brief

Result: NewYork#show appletalk interface brief

| Interface | Address | Config | Status/Line Protocol | Atalk Protocol |
|---|---|---|---|---|
| BRI0 | unassigned | not config'd | administratively down | n/a |
| BRI0:1 | unassigned | not config'd | administratively down | n/a |
| BRI0:2 | unassigned | not config'd | administratively down | n/a |
| Ethernet0 | 2002.14 | Extended | up | up |
| Serial0 | 2010.174 | Extended | up | up |
| Serial1 | 2025.55 | Extended | up | up |
| Serial2 | unassigned | not config'd | administratively down | n/a |
| Serial3 | unassigned | not config'd | administratively down | n/a |

Explanation: The three interfaces you configured (E0, S0 and S1) on router 1 (NewYork) all show that they are 'up'. This means that they are properly configured and operational. This is a good quick check to see if the Appletalk protocol is running. If one of the interfaces that you have configured is 'down', check to be sure that the interface at the other end of the link has the same Appletalk cable range configured on it. The number after the cable-range number is the host number. The host number is dynamically assigned and will probably be different in your display.

Use a brief version of a show command to see that the Appletalk protocol is properly configured and running on the Tokyo router. ～*1606*

Action:    show appletalk interface brief
Result:    Tokyo#sh appletalk interface brief

| Interface | Address | Config | Status/Line Protocol | Atalk Protocol |
|---|---|---|---|---|
| BRI0 | unassigned | not config'd | administratively down | n/a |
| BRI0:1 | unassigned | not config'd | administratively down | n/a |
| BRI0:2 | unassigned | not config'd | administratively down | n/a |
| Ethernet0 | 2038.37 | Extended | up | up |
| Serial0 | 2022.76 | Extended | up | up |
| Serial1 | unassigned | not config'd | administratively down | n/a |
| Serial2 | unassigned | not config'd | administratively down | n/a |
| Serial3 | unassigned | not config'd | administratively down | n/a |

Explanation:    The two interfaces you configured (E0 and S0) on router 2 (Tokyo) all show that they are 'up'. This means that they are properly configured and operational. This is a good quick check to see if the Appletalk protocol is running. If one of the interfaces that you have configured is 'down', check to be sure that the interface at the other end of the link has the same Appletalk cable range configured on it. The number after the cable-range number is the host number. The host number is dynamically assigned and will probably be different in your display.

Use a brief version of a show command to see that the Appletalk protocol is properly configured and running on the London router. ～*1606*

Action:    show appletalk interface brief
Result:    London#show appletalk interface brief

| Interface | Address | Config | Status/Line Protocol | Atalk Protocol |
|---|---|---|---|---|
| BRI0 | unassigned | not config'd | administratively down | n/a |
| BRI0:1 | unassigned | not config'd | administratively down | n/a |
| BRI0:2 | unassigned | not config'd | administratively down | n/a |
| Ethernet0 | 2045.215 | Extended | up | up |
| Serial0 | unassigned | not config'd | administratively down | n/a |
| Serial1 | 2013.235 | Extended | up | up |
| Serial2 | unassigned | not config'd | administratively down | n/a |
| Serial3 | unassigned | not config'd | administratively down | n/a |

Explanation:    The two interfaces you configured (E0 and S1) on router 3 (London) all show that they are 'up'. This means that they are properly configured and operational. This is a good quick check to see if the Appletalk protocol is running. If one of the interfaces that you have configured is 'down', check to be sure that the interface at the other end of the link has the same Appletalk cable range configured on it. The number after the cable-range number is the host number. The host number is dynamically assigned and will probably be different in your display.

*FIG. 17E*

Use a show Appletalk command to view all of the Appletalk parameters of a particular interface. ~~~1606

Action:     show Appletalk interface
Result:     NewYork#show appletalk interface serial 0
            Serial0 is up, line protocol is up
                        AppleTalk cable range is 2010-2019
                        AppleTalk address is 2010.174, Valid
                        AppleTalk zone is "cereal zone"
                        AppleTalk port configuration verified by 2013.235
                        AppleTalk address gleaning is not supported by hardware
                        AppleTalk route cache is enabled Explanation:    The important thing to note here is that the interface show 'up' and line protocol is 'up'. This means the interface is communicating with the network it is connected to. You can also see the Appletalk address of this interface on the fourth line of the example. You can also see that the configuration of this port has been verified by the router at the other end of the link.

Use the 'show Appletalk route' command to look at the Appletalk routing table. ~~~1606

Action:     show appletalk route

Result:     NewYork#show appletalk route
            Codes: R-RTMP derived, E-EIGRP derived, C-connected, A–AURP
                  S-static       P – Proxy
            5 routes in internet The first zone listed for each entry is its default (primary) zone.
            C Net 2000-2009 directly connected, Ethernet0, zone cornflakes
            C Net 2010-2019 directly connected, Serial0, zone cereal zone
            C Net 2020-2029 directly connected, Serial1, zone cereal zone
            R Net 2030-2039 [1/G] via 2022.76, 2 sec, Serial1, zone fruit loops
            R Net 2040-2049 [1/G] via 2013.235, 0 sec, Serial0, zone cocoa puffs
            New York#

Explanation:    After the routing updates propagate (roughly 90 seconds), each router should have five Appletalk routes in its routing table. If they do not, make sure that the routers are properly configured.

Check Results

Router 1
!
hostname Washington
!
enable password cisco
!
!
Interface Ethernet0
ip address 10.28.0.1 255.255.0.0
no keepalive
no shutdown
!
interface Serial0
ip address 10.33.0.2 255.255.0.0
ip mroute-cache
no shutdown
!
interface Serial1
ip address 10.29.0.1 255.255.0.0
clockrate 56000
no shutdown
!
interface Serial2
no ip address
shutdown
!
interface Serial3
no ip address
shutdown
!
interface BRI0
no ip address
shutdown
!
router rip
network 10.0.0.0
!
no ip classless
!
!
banner motd%

IP RIP Foundation Lab Router1
Version: 1.0
Date: July 10, 1998

*FIG. 18B*

Passwords:
User – cisco
Enable – cisco
!
!
line con 0
password cisco
login
line aux 0
line vty 0 4
password cisco
login
!
end

Router 2
!
hostname Minot
!
enable password sanfran
!
!
interface Ethernet0
ip address 10.30.0.1 255.255.0.0
no keepalive
no shutdown
!
interface Serial0
ip address 10.29.0.2 255.255.0.0
lp mroute-cache
no shutdown
!
interface Serial1
ip address 10.31.0.1 255.255.0.0
clockrate 56000
no shutdown
!
interface Serial2
no ip address
shutdown
!
interface Serial3
no ip address
shutdown
!
interface BRI0
no ip address
shutdown
!
router rip

FIG. 18C network 10.0.0.0
!
ip classless
!
!
banner motd %

IP RIP Foundation Lab Router2
Version: 1.0
Date: July 10, 1998

Passwords:
User – cisco
Enable – sanfran
!
line con 0
password cisco
login
line aux 0
line vty 0 4
password cisco
login
!
end

Router 3
!
hostname Leesville
!
enable password sanfran
!
!
interface Ethernet0
ip address 10.32.0.1 255.255.0.0
no keepalive
no shutdown
!
interface Serial0
ip address 10.31.0.2 256.255.0.0
ip mroute-cache
no shutdown
!
Interface Serial1
ip address 10.33.0.1 255.255.0.0
clockrate 56000
no shutdown
!

FIG. 18D interface Serial2
no ip address
shutdown
!
interface Serial3
no ip address
shutdown
!
interface BRI0
no ip address
shutdown
!
router rip
network 10.0.0.0
!
ip classless
!
!
banner motd %

IP RIP Foundation Lab Router3
Version: 1.0
Date: July 10, 1998

Passwords:
User – cisco
Enable – sanfran
!
line con 0
password cisco
login
line aux 0
line vty 0 4
password cisco
login
!
end

FIG. 19A

Check Results

Check your configuration to confirm the network is operating per the Story and Conditions. (Use appropriate show, debug, and ping commands to verify network operations).

> HINT

Verify that the physical links in the network are running.

Action:    show ip interface brief
Results:   HUB#sh ip int brief

| Interface | IP-Address | OK? | Method | Status | | Protocol |
|---|---|---|---|---|---|---|
| BRI0 | unassigned | YES | unset | administratively | down | down |
| BRI0:1 | unassigned | YES | unset | administratively | down | down |
| BRI0:2 | unassigned | YES | unset | administratively | down | down |
| Ethernet0 | 192.168.2.129 | YES | manual | up | | up |
| Serial0 | 172.18.1.33 | YES | manual | up | | up |
| Serial1 | 192.168.2.66 | YES | manual | up | | up |
| Serial2 | unassigned | YES | unset | administratively | down | down |
| Serial3 | unassigned | YES | unset | administratively | down | down |

Explanation:  The configured interfaces should all have up for Status and up for Protocol. If not, use other show commands to determine . . .

Confirm the routing table on Branch_1 supports the Story and Conditions.

Action:    show ip route
Result:    Branch_1#show ip route
          Codes:    C – connected, S – static, I – IGRP, R – RIP, M – mobile, B – BGP
                    D – EIGRP, EX – EIGRP external, O – OSPF, IA – OSPF inter area
                      N1 – OSPF NSSA external type 1, N2 – OSPF NSSA external type 2
                      E1 – OSPF external type 1, E2 – OSPF external type 2, E – EGP
                      i – IS-IS, L1 – IS-IS level-1, L2 – IS-IS level-2, * – candidate default
                      U – per-user static route, o – ODR Gateway of last resort is 192.168.2.66 to network 172.18.0.0

I*          172.18.0.0/16 [100/82125] via 192.168.2.66, 00:00:11, Serial0
                     192.168.2.0/28 is subnetted, 3 subnets
          C           192.168.2.64 is directly connected, Serial0
          C           192.168.2.192 is directly connected, Ethernet0
          I           192.168.2.128 [100/80225] via 192.168.2.66, 00:00:12, Serial0

Branch_1#
Explanation:  Except for the time since last routing update, your routing table on Branch_1 should match the Results above. Do your metrics well?

Note that the Gateway of last resort and the candidate default route must both appear.

Confirm the routing table on the ISP supports the Story and Conditions.

Action: show ip route
Result: ISP#sh ip ro
Codes: C – connected, S – static, I – IGRP, R – RIP, M – mobile, B – BGP
D – EIGRP, EX – EIGRP external, O – OSPF, IA – OSPF inter area
N1 – OSPF NSSA external type 1, N2 – OSPF NSSA external type 2
E1 – OSPF external type 1, E2 - OSPF external type 2, E - EGP
i – IS-IS, L1 – IS-IS level-1, L2 – IS-IS level-2, * – candidate default
U – per-user static route, o – ODR Gateway of last resort is not set

```
         172.18.0.0/30 is subnetted, 1 subnets
C           172.18.1.32 is directly connected, Serial1
         10.0.0.0/24 is subnetted, 1 subnets
C           10.1.3.0 is directly connected, Ethernet0
S        192.168.2.0/24 [1/0] via 173.18.1.33
ISP#
```

Explanation: The ISP should have three subnets listed.

Confirm the routing table on the Hub supports the Story and Conditions.

Action: show ip route
Result: *{There are two main possible results, depending on how the default route was configured}*

Hub#sh ip ro
Codes: C – connected, S – static, I – IGRP, R – RIP, M – mobile, B – BGP
D – EIGRP, EX - EIGRP external, O - OSPF, IA - OSPF inter area
N1 – OSPF NSSA external type 1, N2 – OSPF NSSA external type 2
E1 – OSPF external type 1, E2 – OSPF external type 2, E – EGP
i – IS-IS, L1 – IS-IS level-1, L2 – IS-IS level-2, * – candidate default
U – per-user static route, o – ODR Gateway of last resort is 172.18.1.34 to network 0.0.0.0

```
*        172.18.0.0/30 is subnetted, 1 subnets
C           172.18.1.32 is directly connected, Serial0
         192.168.2.0/28 is subnetted, 3 subnets
C           192.168.2.64 is directly connected, Serial1
I           192.168.2.192 [100/80225] via 192.168.2.65, 00:00:13, Serial1
C           192.168.2.128 is directly connected, Ethernet0
S*       0.0.0.0/0 [1/0] via 172.18.1.34
Hub#
```

```
Hub#sh ip ro
Codes:    C – connected, S – static, I – IGRP, R – RIP, M – mobile, B – BGP
          D – EIGRP, EX – EIGRP external, O - OSPF, IA – OSPF inter area
          N1 – OSPF NSSA external type 1, N2 – OSPF NSSA external type 2
          E1 – OSPF external type 1, E2 – OSPF external type 2, E – EGP
          i – IS-IS, L1 – IS-IS level-1, L2 – IS-IS level-2, * – candidate default
          U – per-user static route, o – ODR Gateway of last resort is 0.0.0.0 to network 0.0.0.0

*         172.18.0.0/30 is subnetted, 1 subnets
C             172.18.1.32 is directly connected, Serial0
          192.168.2.0/28 is subnetted, 3 subnets
C             192.168.2.64 is directly connected, Serial1
I             192.168.2.192 [100/80225] via 192.168.2.65, 00:00:19, Serial1
C             192.168.2.128 is directly connected, Ethernet0
S*        0.0.0.0/0 is directly connected, Serial0

Hub#
```

Explanation:   Both options for configuring a default route will support the network.

Note: Do your metrics match as well?

Verify that the network is operating as described in the Story and Conditions.

Action:   ping *ip-address*
Result:   Branch_1#ping 10.1.3.1

```
Type escape sequence to abort.
Sending 5, 100-byte ICMP Echos to 10.1.3.1, timeout is 2 seconds:
!!!!!
Success rate is 100 percent (5/5), round-trip min/avg/max = 32/34/36 ms Branch_1#

. . .

ISP#ping
Protocol [ip]:
Target IP address: 192.168.2.129
Repeat count [5]:
Datagram size [100]:
Timeout in seconds [2]:
Extended commands [n]: y
Source address or interface: 10.1.3.1
Type of service [0]:
Set DF bit in IP header? [no]:
Validate reply data? [no]:
Data pattern [0xABCD]:
Loose, Strict, Record, Timestamp, Verbose [none]:
```

Sweep range of sizes [n]:
Type escape sequence to abort.
Sending 5, 100-byte ICMP Echos to 192.168.2.129, timeout is 2 seconds:
!!!!!
Success rate is 100 percent (5/5), round-trip min/avg/max = 16/17/20 ms ISP#ping
Protocol [ip]:
Target IP address: 192.168.2.193
Repeat count [5]:
Datagram size [100]:
Timeout in seconds [2]:
Extended commands [n]: y
Source address or interface: 10.1.3.1
Type of service [0]:
Set DF bit in IP header? [no]:
Validate reply data? [no]:
Data pattern [0xABCD]:
Loose, Strict, Record, Timestamp, Verbose [none]:
Sweep range of sizes [n]:
Type escape sequence to abort.
Sending 5, 100-byte ICMP Echos to 192.168.2.193, timeout is 2 seconds:
!!!!!
Success rate is 100 percent (5/5), round-trip min/avg/max = 32/33/36 ms

ISP#

| | |
|---|---|
| Explanation: | Your ping tests from Branch_1 to the subnet 10.1.3.0 should be successful. Extending ping tests from the ISP's Ethernet to the Ethernet and Branch_1's Ethernet should also be successful. |

Verify that the routing updates have been minimized as described in the Story and Conditions.

| | |
|---|---|
| Action: | debug ip packet |
| Result: | ISP#debug ip packet<br>IP packet debugging is on<br>ISP#<br>. . .<br>ISP#no debug ip packet<br>IP packet debugging is off<br>ISP# |
| Explanation: | The debugging information should be quiet after several minutes. If so, you can turn off IP packet debugging, and know that IG routing packets are not being sent to the ISP. |

*FIG. 19D*

1002. Connectivity Between Routers
vLab Archive

▼ Archive History

▼       Archive Date

Date Lab Started: 1999-Jul-15 16:06:40.864802

Date Lab Completed: 1999-Jul-15 16:09:49.268665

Date Lab Archived: 1999-Jul-15 16:10:23.670189

▼       Lab Information

*2002* ——— Plan

*2004* ——— Debrief

*2006* ——— Saved Configs

FIG. 20

METHODS AND APPARATUS FOR COMPUTER BASED TRAINING RELATING TO DEVICES

RELATED APPLICATIONS

The following applications contain subject matter related to the subject matter of the present application, are assigned to the assignee hereof and have been filed on the same date as the present application.

1. Terrance C. Slattery, Shawn G. Coville, Gregory R. Long, M. Tylor Burton III, "Methods and Apparatus for a Virtual Classroom."
2. Terrance C. Slattery, Shawn G. Coville, Gregory R. Long, M. Tylor Burton, Lawrence F. Galvin, "Methods and Apparatus for Computer Based Assessment Relating to Devices."
3. Terrance C. Slattery, Shawn G. Coville, Gregory R. Long, Karl J. Schmidt, Kenneth C. M. Stevenson III, Mark W. Decker, "Methods and Apparatus for a Learning Structure in Computer Based Training Relating to Devices."
4. Terrance C. Slattery, Shawn G. Coville, Karl J. Schmidt, Kenneth C. M. Stevenson III, "Methods and Apparatus for a User Interface for Computer Based Training Relating to Devices."

BACKGROUND OF THE INVENTION

The present invention relates to computer based training, and more particularly, to methods and apparatus for computer based training providing hands-on training related to devices.

Traditionally, students have been taught about devices in a classroom setting where the students were lectured about the devices and presented with written tests. Although students have been taught in a lab setting, this requires students to travel to a specific location to perform the lab Thus, making it difficult and inconvenient for students without easy access to a lab.

Thus, it has been difficult for students to gain hands-on experience regarding devices in a classroom setting, in their office place, or at home. Further, the need for more hands on time with devices is becoming critical for professionals that are working towards certifications such as the CISCO Certified Internetworking Expert (CCIE) certification, which is the highest certification level bestowed by CISCO.

Accordingly, there is a need for a distance based solution that provides students with hands-on training with devices.

SUMMARY OF THE INVENTION

Accordingly, the present invention is directed to methods and apparatus that substantially obviates the above and other disadvantages of the prior art.

Methods and systems consistent with the present invention include a system for training a user regarding controlling a device. This system includes a user computer for accepting device control information regarding controlling the device for the purposes of training, and a device controller remotely connected to the user computer. The device controller preferably includes means for receiving the device control information from the user, and means for transferring the device control information to the device.

In another aspect, the invention comprises a method for training a user regarding controlling a device. This method includes a user remotely connecting to a device controller using a user computer; the user computer transferring user information regarding control of the device to a device controller, and the device controller transferring the user information to the device.

The summary of the invention and the following detailed description should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BRIEF DESCRIPTION OF THE DRAWINGS

In the Figures:

FIG. 4 illustrates a graphical interface, in accordance with methods and systems consistent with the invention;

FIG. 7 illustrates a page that may be used for setting up a user account, in accordance with methods and systems consistent with the invention;.

FIG. 15 illustrates an example of a page that provides a user with a suggested approach, in accordance with methods and systems consistent with the invention;

FIG. 17 illustrates an example of an html page that provides a sample solution, in accordance with methods and systems consistent with the invention;

FIG. 18 illustrates an example of a page for the check results module, in accordance with methods and systems consistent with the invention;

FIG. 19 illustrates an example of a page for the check results module, in accordance with methods and systems consistent with the invention.

FIG. 20 illustrates an example of a page that includes archived information for a lab, in accordance with methods and systems consistent with the invention.

DETAILED DESCRIPTION OF THE INVENTION

Figure 1:
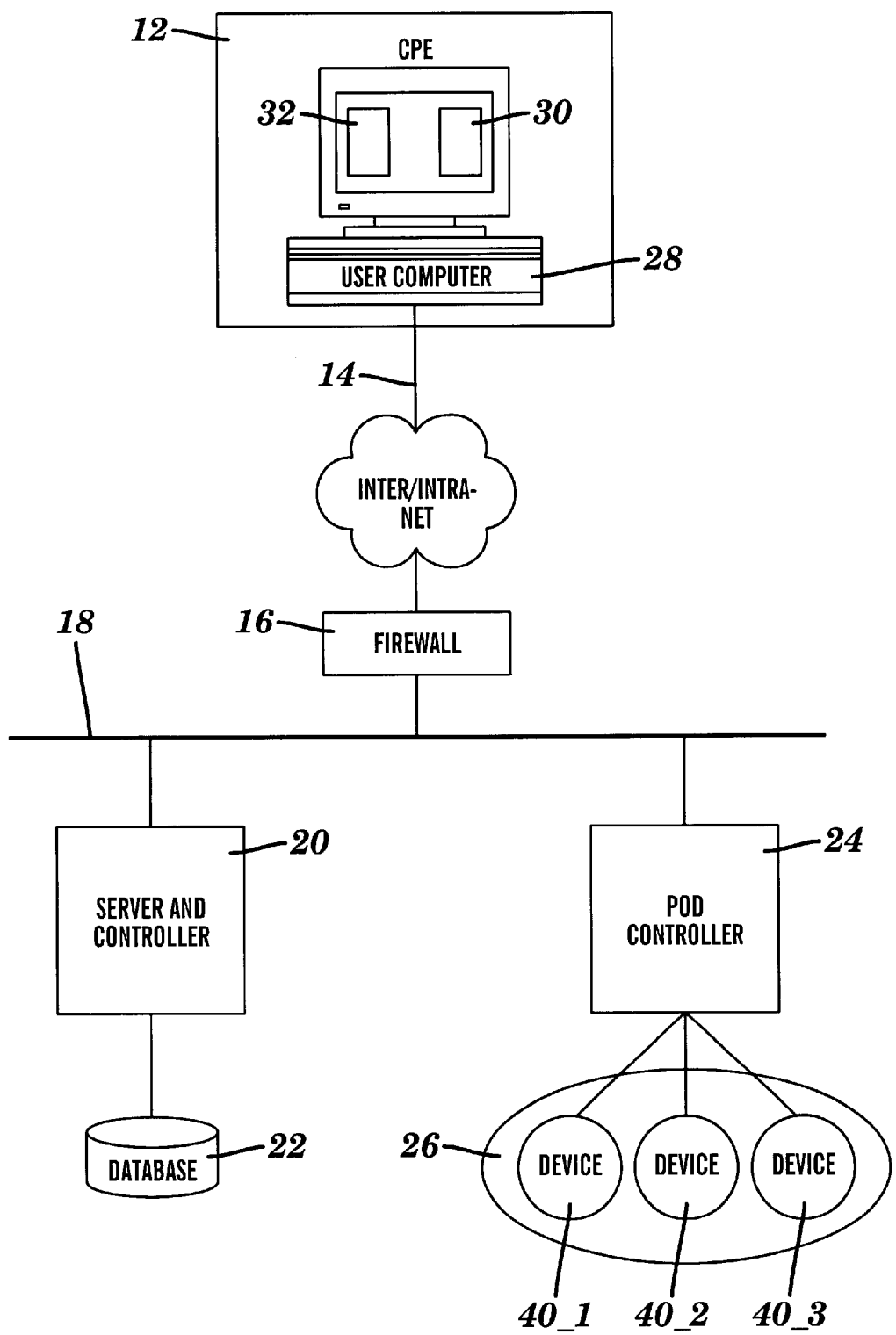
FIG. 1 illustrates a block diagram of a computer-based system for training of devices in accordance with methods and systems consistent with the invention.

Reference will now be made in detail to embodiments of the invention, examples of which are illustrated in the accompanying drawings. Wherever possible, the same reference numbers will be used throughout the drawings to refer to the same or like parts.

Engine

Figure illustrates a simple block diagram of a computer-based system for training relating to devices. As shown, the system preferably includes customer premise equipment 12, a communications link 14, a firewall 16, a communications line 18, a server and controller 20, a database 22, a pod controller 24, and a pod 26. The Customer Premise Equipment (CPE) 12 may include a computer 28 provided with a browser program 30 and a network application program 32. The browser 30 may be a browser for Internet/Intranet communications, such as a Netscape Navigator™ browser or a Mircrosoft Internet Explorer™ browser. The network application program 32 may be a program such as TELNET. The communications link 14 may traverse the Internet or an Intra-net. The pod controller 24 may control one or more pods 26 each of which may contain one or more user devices 14_1 to 14_3. In this embodiment, the user devices 14_1 to 14_3 are network equipment, such as CISCO type switches or routers[. In other embodiments, these], although the user devices 14_1 to 14_3 may be Programmable Logic Controllers (PLCs), Chemistry Equipment, or any other type of device. Further, a pod controller 24 may also control one or more infrastructure devices (not shown). These infrastructure devices provide an authentic environment for which a real world scenario may be written.

Figure 2:
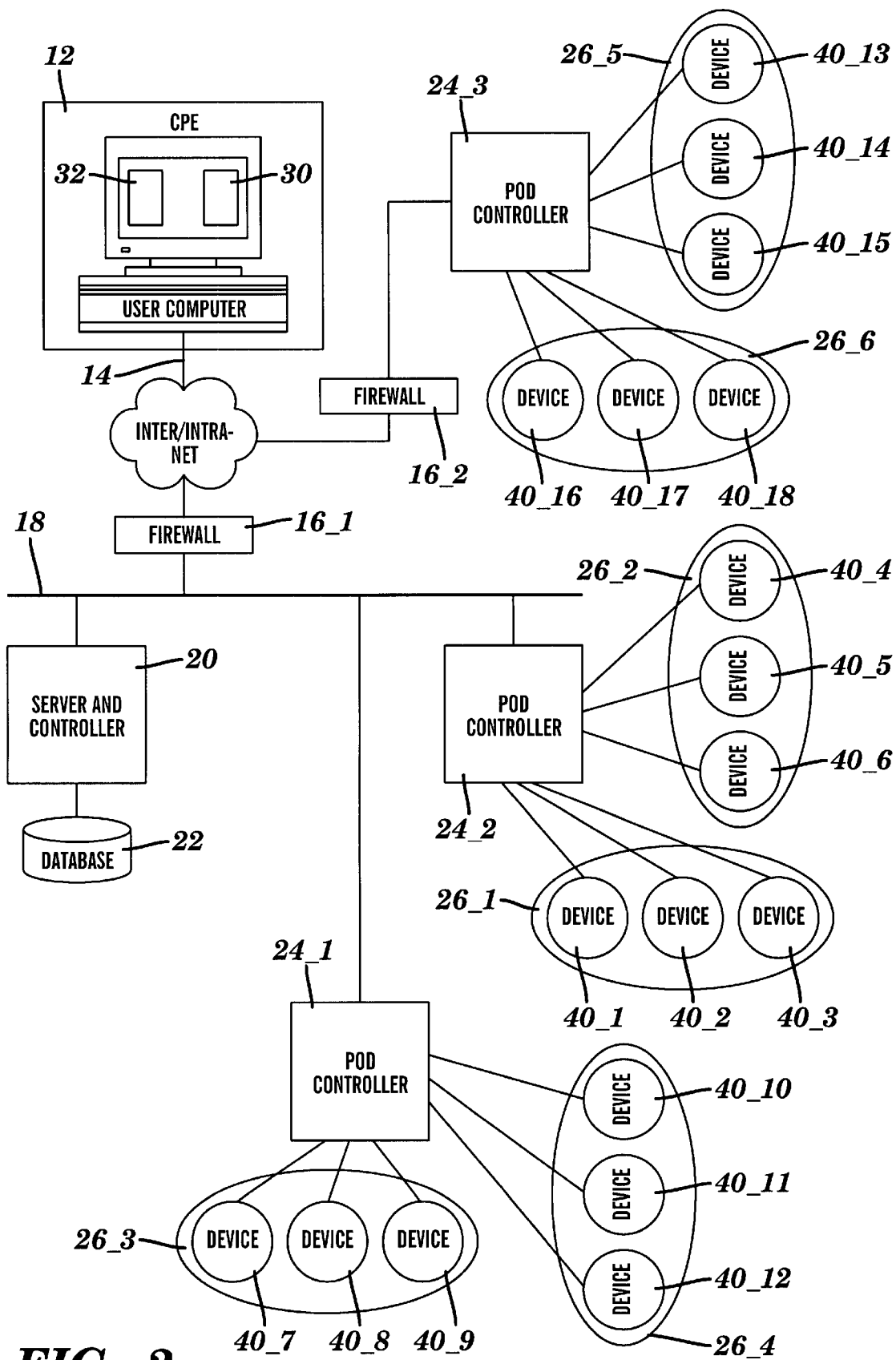
FIG. 2 illustrates a block diagram showing a distributed set of pod controllers, in accordance with methods and systems consistent with the invention.

FIG. 2 illustrates a simple block diagram of an embodiment with multiple pod controllers 24_1 to 24_3. In this embodiment, pod controllers 24_1 and 24_2 are behind firewall 16_1, and pod controller 24_3 is behind firewall 16_2.

Figure 3:
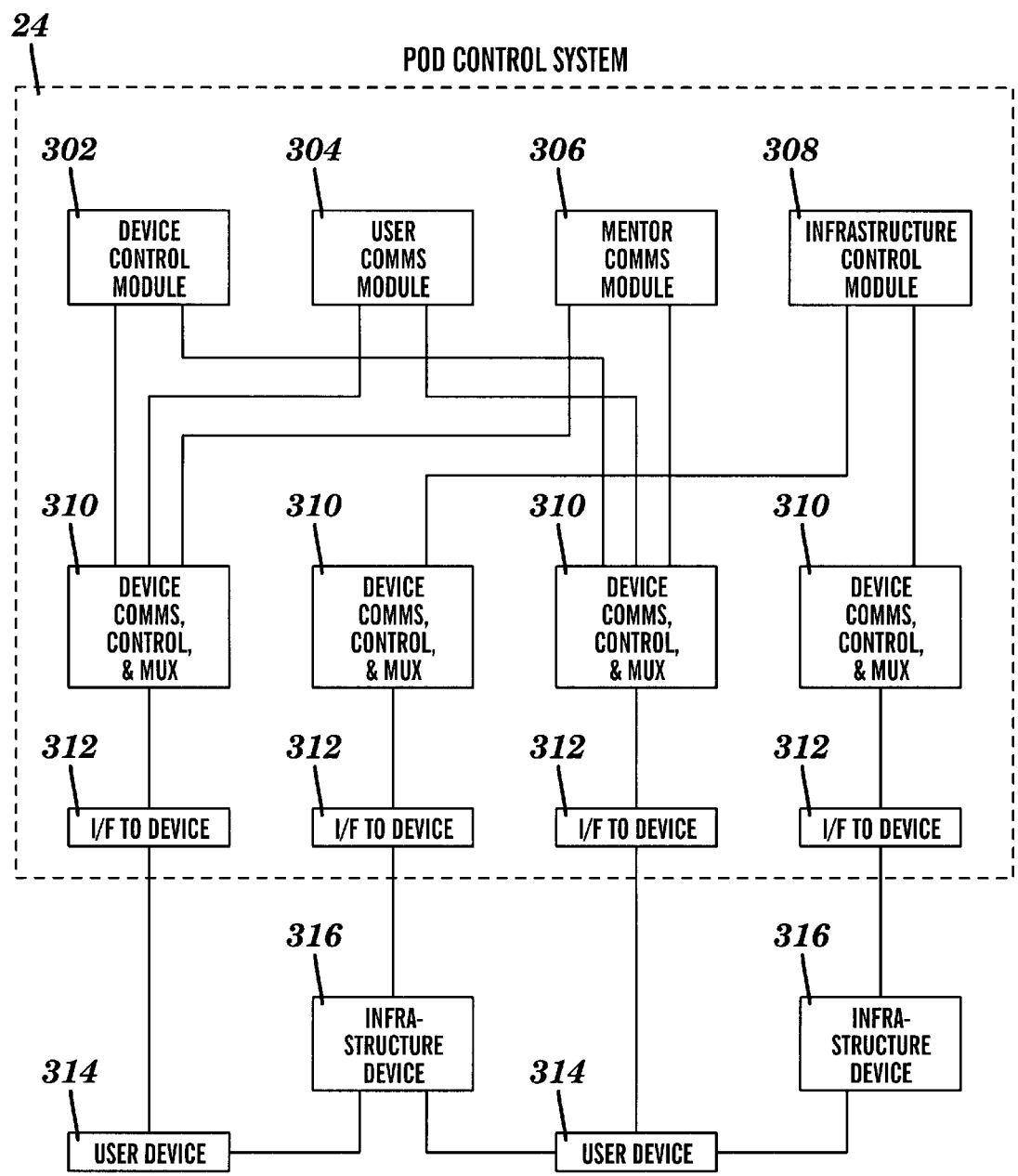
FIG. 3 provides a detailed diagram of a pod controller, in accordance with methods and systems consistent with the invention.

FIG. 3 provides a more detailed diagram of the pod controller 24, consistent with an embodiment of the invention. The pod controller 24 may include a device control module 302, a user communications module 304, a mentor communications module 306, an infrastructure control module 308, a device communications, control, and multiplexor module 310, and an interface to device module 312. The pod controller 24 may be connected to user devices 314, and infrastructure devices 316.

The device control module 302 is used to control user accessible devices. It incorporates the control software that enables the pod control system to load starting configurations into the user devices, reset the user devices and save final configurations. The control within this module may be high level and generic across all devices, increasing the modularity and maintainability of the overall system.

The user communications module 304 operates such that when a user connects to a user device, the connection is made through the user communications module. This module receives the connection from the network and validates the user's authorization to access specific devices. This module further translates information received by a user in one protocol into a protocol for feeding into the user device.

The mentor communications module 306 permits a mentor to monitor and participate in controlling the user devices during a learning exercise. The mentor communications module 306 authenticates and authorizes the mentor to connect to specific devices through a computer. A mentor may be a program, such as an Artificial Intelligence program, a person, or any type of hardware or software capable of aiding a user in learning about the user device and its operation.

The infrastructure control module 308 allows additional devices to be interconnected to the user devices in order to replace real-world scenarios. These devices are part of the infrastructure and may require separate control by the pod controller 24. As such, this module 308 provides the control of the infrastructure devices that are needed to create a real-world scenario for the user. The infrastructure devices 316 are discussed in greater detail below. Further, this modules in conjunction with device, communications, control and multiplexer modules 310, permits devices to be moved between pods connected to the pod controller 24. This will be discussed in further detail below.

A device communications, control, and multiplexor module 310 provides low-level communications and control for each device. In addition, this module provides a mechanism for multiple modules to simultaneously communicate with a single device. Further, as discussed above, this module permits devices to be moved between pods connected to the pod controller 24. For example, FIG. 2 illustrates user device 40_4 as part of pod 26_2. If a user wishes to perform an assignment that needs four user devices, the device communications, control, and multiplexor module 310 for user device 40_4 may be reconfigured to move user device 40_4 into pod 26_1. Further, the infrastructure control module 308 may also be reconfigured so that the infrastructure devices necessary for supporting this move are also reconfigured. Thus, pod 26_1 would now include four user devices so that a user wishing to perform the assignment can use pod 26_1 and pod controller 24_1.

The interface to device module 312 is generally implemented in a combination of hardware and software, and provides the pod controller 24 with the capability of the pod controller 24 to communicate directly with the device. For example, if the device 314 uses an RS-232 or similar interface, this module may include software and hardware for implementing an RS-232 connection to the device. Other connection types are possible, such as Ethernet, and the connection type will be dependent on the specifics of the device. Further, this module is capable of receiving information from a user in an application layer protocol, such as TELNET, and translating it so that the information can be communicated directly to a user device.

Each of the modules may be implemented by software running on a processor or computer. As will be obvious to one skilled in the art, all of these modules may be implemented on a single processor, or multiple processors may be used. A variety of computer programming languages may be used to implement the software programs.

The infrastructure devices 316 permits user devices 314 to be interconnected into realistic configurations. The infrastructure devices are not directly accessible by the user. However, the system may implement functions that affect the configuration of these devices depending upon the user's actions. For example, a Frame Relay switch may be used to implement a wide area network connection between user devices. Such a switch may need to be configured and controlled for specific exercises, but because multiple users may need to share it, the switch will not be directly available to the user.

The server and controller 20 may be a computer including memory, a processor, a communications port, a display screen, keyboard, and a mouse. Further, the server and controller 20, for example, may be a web server, such as an Apache or an AOL Server, that uses the Common Gateway Interface (CGI) to allow programs to be executed within the server and controller 20. These programs may provide services to a user via the web such as static web pages, a scheduling mechanism to allow a user to schedule the execution of a specific lab or course at a given time, a lab or course catalog displayed via a web page showing all labs or courses which can be executed, an electronic commerce engine through which users may purchase labs or courses online, and/or a web page which provides a graphical interface for accessing the user devices in specific labs and initiating device control software.

The server and controller 20 may send either static or dynamic web pages to the user's CPE 12 so that they may be displayed to the user through their browser. The content of the user interface page may include buttons and hot links for the user to invoke the device-specific operations that may be necessary to control the user devices for the purposes of accomplishing a lab or course.

The server and controller 20 may send either static or dynamic web pages to the user's CPE 12 so that they may be displayed to the user through their browser. The content of the user interface page may contain buttons and hot links for the user to invoke the device-specific operations necessary to control the user devices for the purposes of accomplishing a lab or course.

The user computer 28 may be a standard user computer such as an IBM compatible Personal Computer (PC) or Macintosh. Further, the user computer may include a memory, a processor, a keyboard, a mouse, and a port for receiving and transmitting information. The keyboard and mouse may be used by a user to enter information into the computer. The memory may be used for storing programs, such as the browser and network applications programs. The processor may be used for executing these programs. The display screen may be used for displaying information to the user such as html pages, and screens for the browser and network applications programs. The communications port may be used for sending and receiving information over a communications link.

Figure 5:
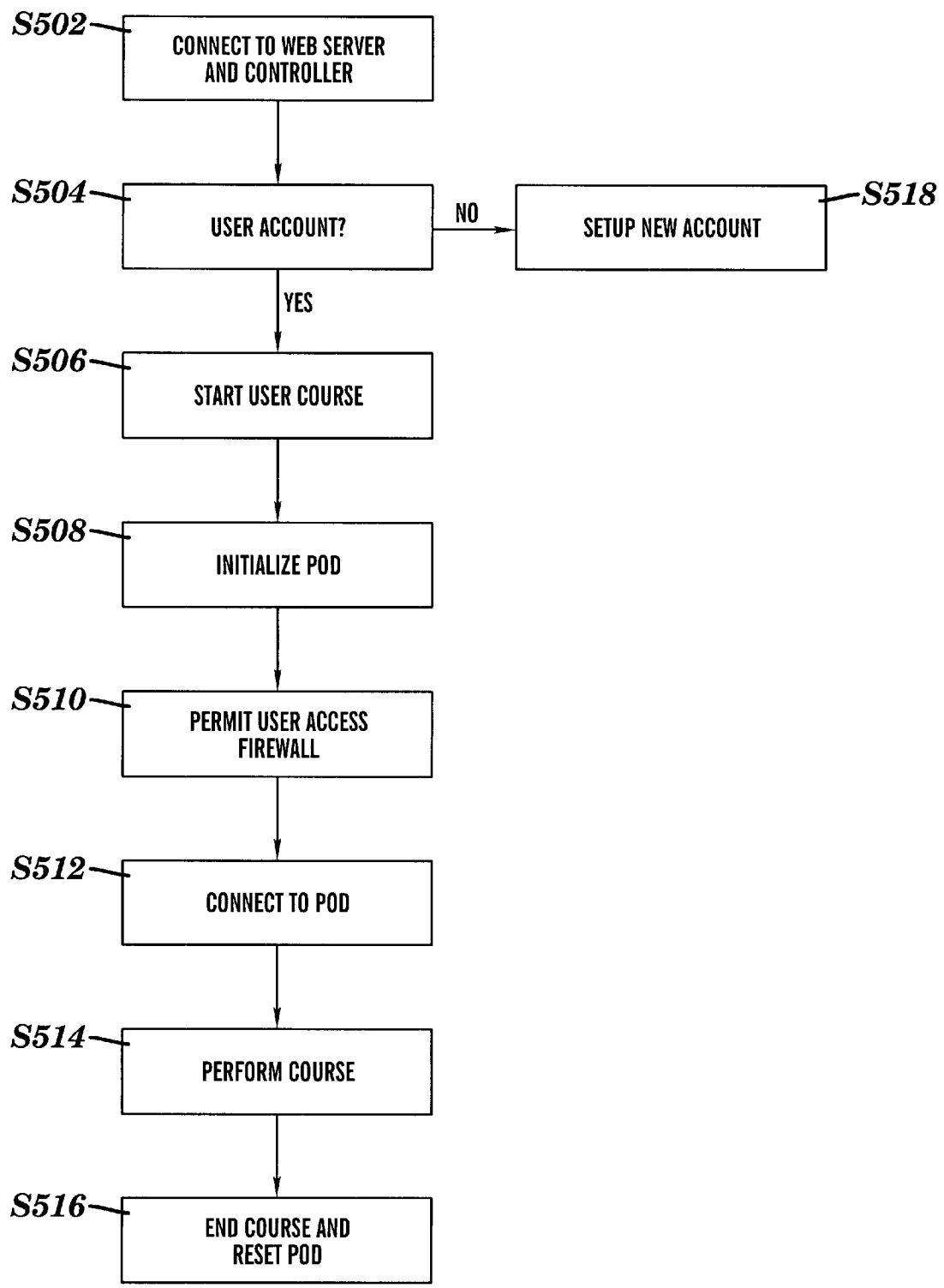
FIG. 5 provides a flow diagram for a computer based training system, in accordance with methods and systems consistent with the invention.
Figure 6:
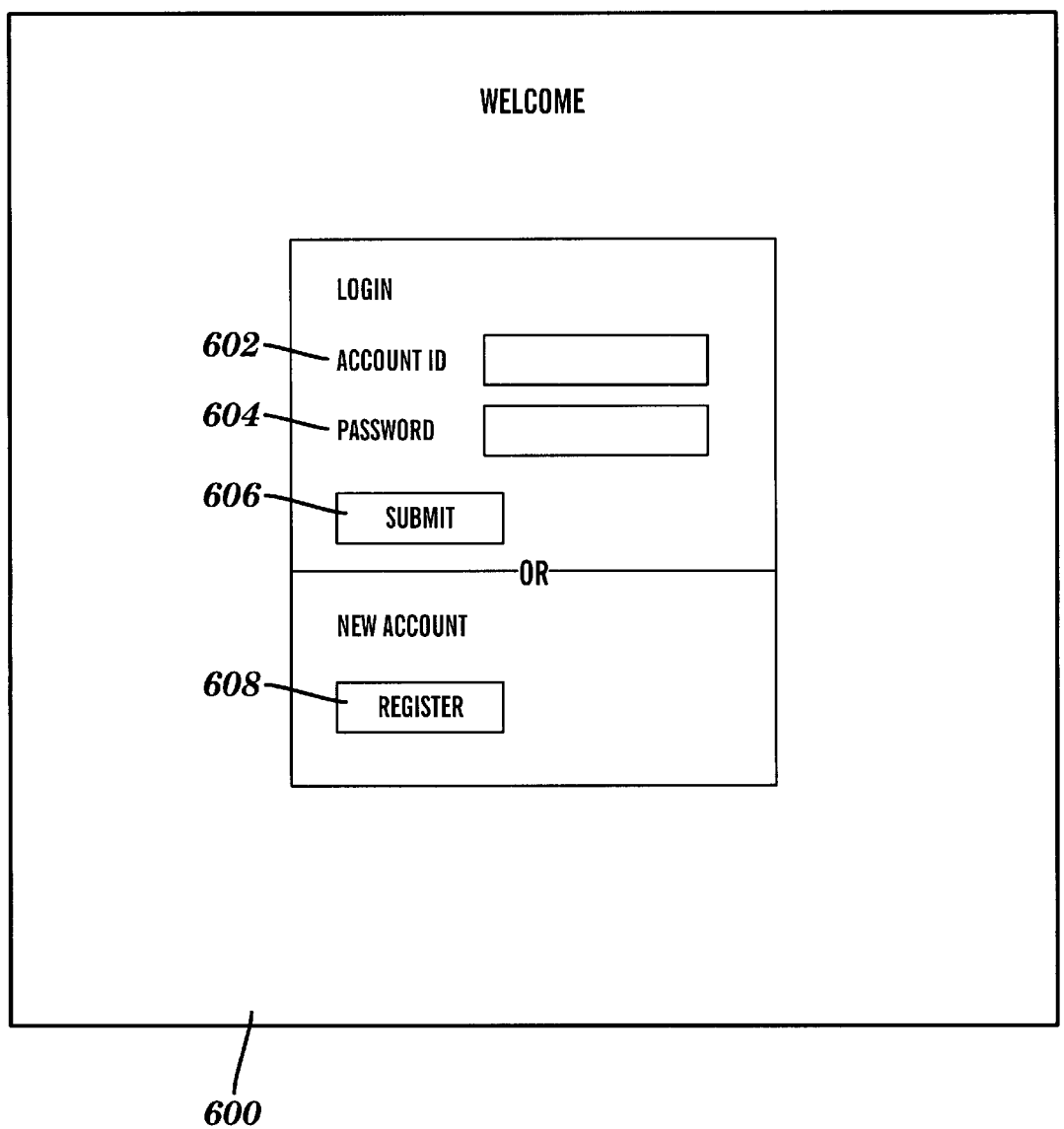
FIG. 6 illustrates an example page that may be displayed to a user to log in or to request account information, in accordance with methods and systems consistent with the invention.

FIG. 5 provides a flow diagram for the computer based training system of FIG. 1. A user initializes the system by instructing the browser 30 on his/her computer 28 to connect to the server and controller 20 (S502). The firewall 16 maybe set up to allow the browser 30 and server and controller 20 to freely communicate. The server and controller 20 may display a page to the user requesting an account identification and password and use this information to determine if the user has an account (S504). FIG. 6 illustrates an example html page 600 that may be displayed to a user to request a user's account identification 602 and password 604. The user can then click on the submit button 606 to submit the information once it has been entered. The user account may contain, among other things, a course for the user and course specific information If the user has an account, the course is selected and started (S506). If the user does not have an account, he/she is directed to a page for setting up a user account (S518). For example, as illustrated in FIG. 6, a user without an account identification is directed to click on a Register button 608. FIG. 7 illustrates an html page 700 that may be used for setting up a user account This page may request, for example, his/her name 702, address 704, a user name 706, and a password 708.

After the course is selected, the server and controller 20 sends an instruction to the pod controller to initialize a pod 26 associated with the selected course (S508). Further, the server and controller 20 sends an instruction to the firewall 16 to permit the user's CPE 12 to access the pod controller 24 (S510). The user then connects to the pod controller 24 using a network application program 32, such as Telnet (S512). Through this mechanism, the user can exercise control over the user devices and perform the assigned training exercise.

A graphical interface may be presented to the user that includes buttons and/or hot links regarding the various user devices. These buttons and/or hotlinks may be used by the user to perform various functions regarding the user devices. The graphical interface may include a button for resetting a user device to its initial starting configuration, a button for saving an existing configuration, a button for loading a new configuration, or a button for forcing the user device into a diagnostic control mode. The user may perform these functions by clicking on a specifically labeled button on the graphical interface. The specific buttons or hotlinks and their respective functions will depend on the specifics of the user devices that make up the lab or course. For example, a chemistry lab may use buttons for controlling a mechanical shuttle which moves a beaker to different locations within an experiment, the addition of a chemical to the beaker, controlling a heating element, or controlling the agitation of the solution within the beaker.

FIG. 4 provides an example of a graphical interface a user may see when interacting with a lab including three Cisco routers. The available functions in this example are: reset 402, save configuration 404, load configuration 406, and cycle-break 408. The user may click on the icon 410 of a user device to open a communications connection to the user device when completing the objectives of the lab or course. Further, in this example, the user may click on links for the instructions 412, scenario and assignment 414, mentoring 416, view plan 418, suggested approach 420, sample solution 422, and check results 424. By clicking on one of these links, the user will be taken to an associated web page. These links will be discussed in greater detail later.

After completion of the course, the user's CPE 12 is disconnected from the user devices 40_1 to 40_3 by the pod controller 24, and the user devices are reset to their original settings (S516). For routers, these user devices can be reset by sending a specific sequence to the router that permits the system to gain access to the router even if the user alters the passwords for the router. This may be accomplished by turning off the router, and then turning it back on. During the boot up, control characters can be sent to the router to cause it to enter ROM mode. Once the router is in ROM mode, the user device can be reset so that another user can use the user devices regardless of what the previous user did to the user device.

Figure 8:
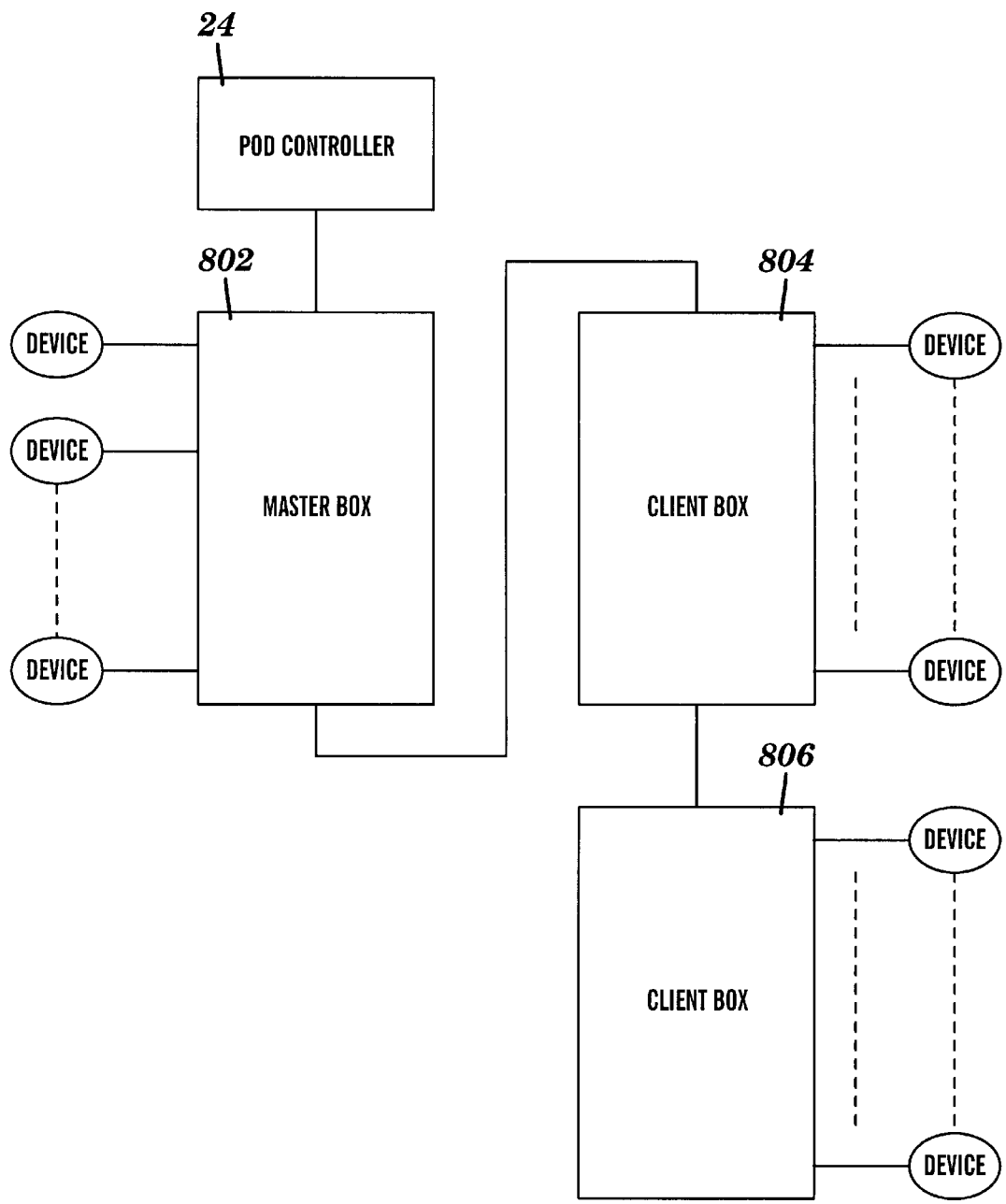
FIG. 8 illustrates Relay Control Boxes, in accordance with methods and systems consistent with the invention.

If the user device is a CISCO-type switch, a specific button needs to be. pushed during power up in order to enter ROM mode. This switch may be replaced by a relay to close the switch. Thus, the pod controller could reset this user device by closing the relay, or by manually operating the switch. As an example, FIG. 8 illustrates three Relay Control Boxes 802, 804, and 806 for resetting devices in which a physical switch needs to be pressed at a particular point in time. Each Relay Control Box may include eight internal relays for controlling eight independent devices. Each relay replaces the physical switch in the device. As illustrated, a master Relay Control Box 802 is connected directly to the Pod Controller 24, and each client Relay Control Box 804 and 806 is serially connected to the master Relay Control Box 802. When a device is to be reset, the pod controller 24 sends an address for the device to the Relay Control Boxes 802, 804, and 806. The Relay Control Boxes 802, 804, and 806 then use this address to close a relay associated with this address that in effect closes the switch for the device. Thus, the Relay Control Boxes and Pod Controller can individually open and close the switches for the particular devices. This example is provided as merely one possible implementation, and as will be obvious to one of skill in the art numerous other implementations are possible. Further, the specifics of how to reset a device will depend on the particulars of the specific device.

In one embodiment, a user devices 14_1 to 14_3 are CISCO-type routers and are connected to the pod controller through a COM port. In this embodiment, the pod controller 24 converts the user information from the application layer format it is received in (for example, TELNET) to a format that can be sent to the router through the router's COM port. This is may be accomplished by the user communications module 304 of the pod controller 24.

Figure 9:
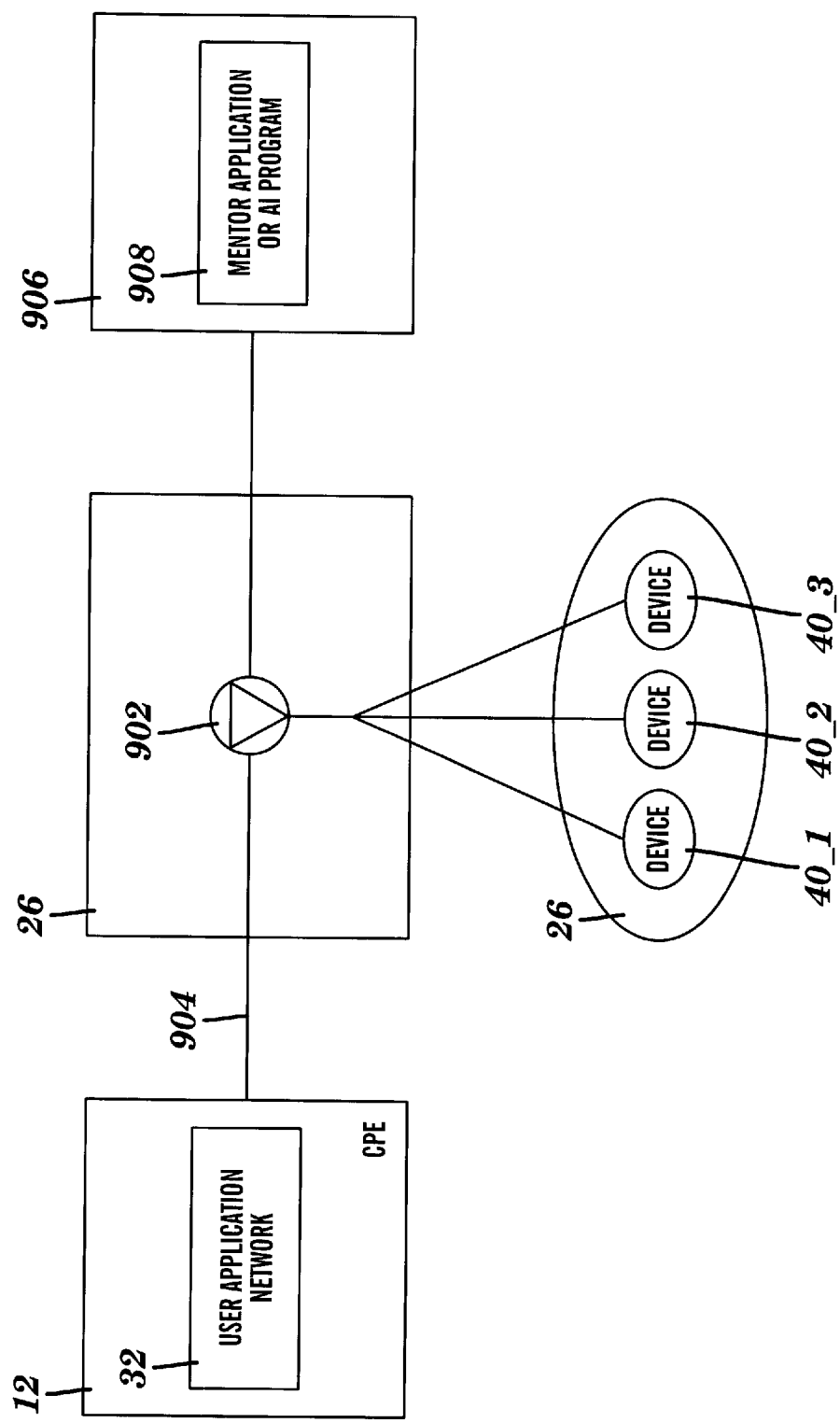
FIG. 9 illustrates a block diagram of a pod controller including a wiretap, in accordance with methods and systems consistent with the invention.

FIG. 9 illustrates a block diagram of a pod controller 24 including a wiretap 902, according to an embodiment. As shown, the pod controller of this embodiment is connected to a user's network application program 32, such as TELNET, over a network connection 904 that preferably includes, referring back to FIG. 1, a communications link 14 from the CPE 12 to the firewall 16 and a connection from the firewall 16 to the pod controller 24 over communications link 18. Also connected to the wiretap 902 is a mentor's equipment 906 operating a network application 908, such as Telnet. Through this mechanism, a mentor can monitor the instructions the user is sending to the user devices in the pod. As such, the mentor can "watch" what the user is doing, so that the mentor can ensure that the user is properly controlling the user device. Various software and hardware can be used to implement the wiretap. For example, KIBITZ, a program available with the freeware package EXPECT, allows two users to collaborate over a network while interacting with a single program. Thus, by using one KIBITZ for each user device, everything the user types can be seen by the mentor, and visa versa. Other programs with similar functionality may also be used to achieve this type of operation. The wiretap 902 may be implemented in the device communications, control, and multiplexor module 310 of the pod controller 24.

Additionally, this wiretap may permit the mentor to take control of the user devices in the pod so that the user can "watch" the instructions the monitor is sending to the user devices. Thus, the mentor can show the user how to correctly operate the user devices to perform a task. In another embodiment, the wiretap may be connected to an Artificial Intelligence program that oversees the user's operation of the user devices.

Virtual Classroom

Figure 10:
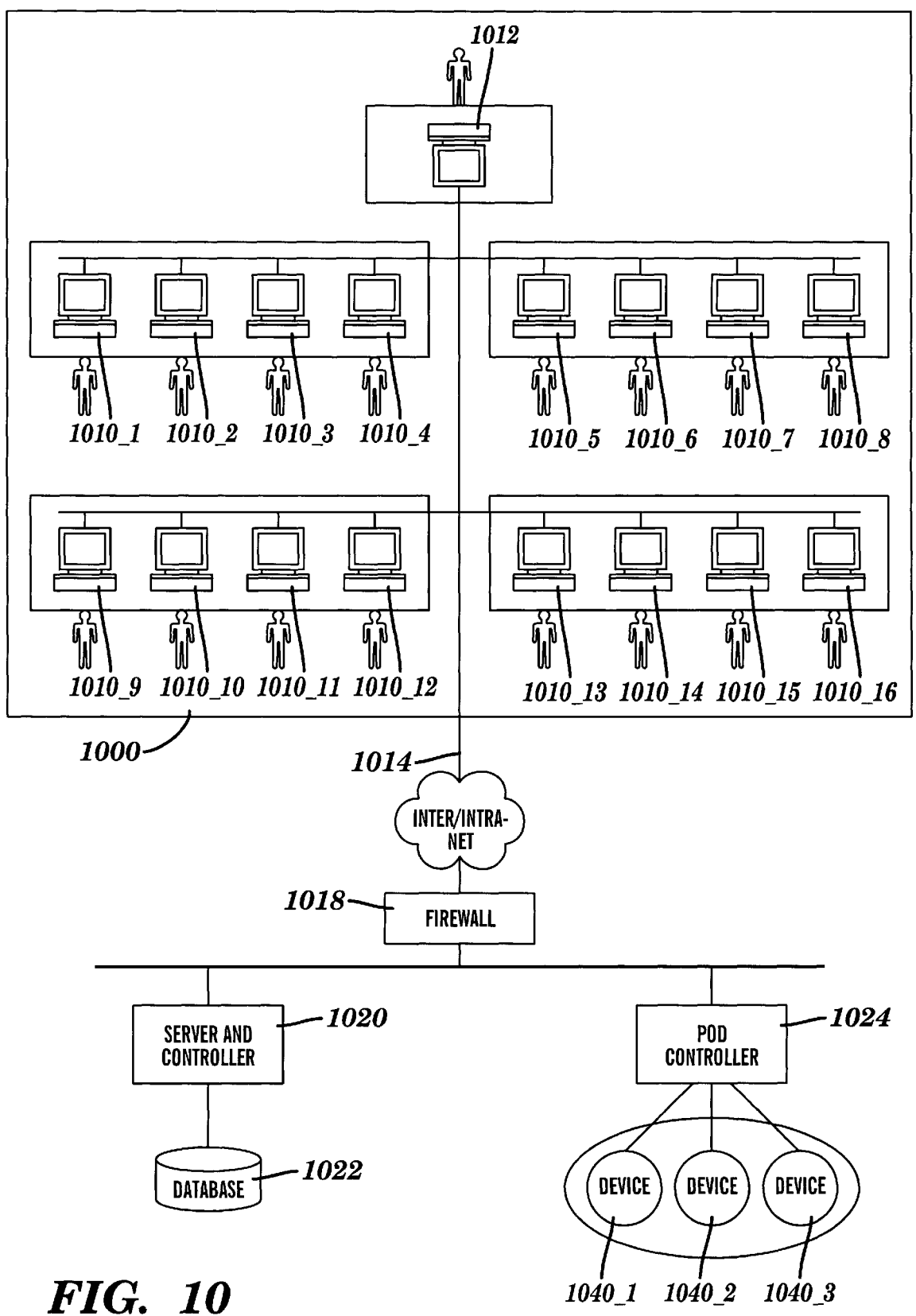
FIG. 10 provides an illustration of a Virtual Classroom, in accordance with methods and systems consistent with the invention.

FIG. 10 provides an illustration of a Virtual Classroom, 1000 consistent with an embodiment of the invention. As shown, the Virtual Classroom 1000 preferably includes a plurality of student terminals 1010_1 to 1010_16, an instructor terminal 1012, a communications link 1014, a firewall 1018, a server and controller 1020, a pod controller 1024, and a pod 1026. The pod 1026 preferably includes a plurality of user devices 1040_1 to 1040_3. The number of devices needed will depend on the class objectives. The server and controller is optionally connected to a database 1022 that stores class specific information. The student terminals 1010_1 to 1010_16 each preferably include a browser (not shown) that may be a browser for Internet/Intranet communications, such as a Netscape Navigator™ browser or a Microsoft Internet Explorer™ browser. Further, each student terminal 1010_1 to 1010_16 preferably includes a network application (not shown) for sending control information to the user devices. In one embodiment, the network application program is TELNET. The communications link can be any type of communications link, and may be, for example, a link across an Internet or Intra-net. Further, a server (not shown) may be used to connect the student and instructor terminals to an Internet or Intra-net that links the terminals to the server and controller 1020 and pod controller 1024.

Individual students need not be located at the same physical location. For example, one student may be located at one physical location, another student may be located in a physical location in a different city, a third student may be located in yet another city, and so on. The communications between the instructor and students can be supported using a variety of communications applications. For example, ILINC, Placeware, or Caliver communications applications may be used for supporting these communications. Further, the class can be conducted synchronously or asynchronously.

Figure 11:
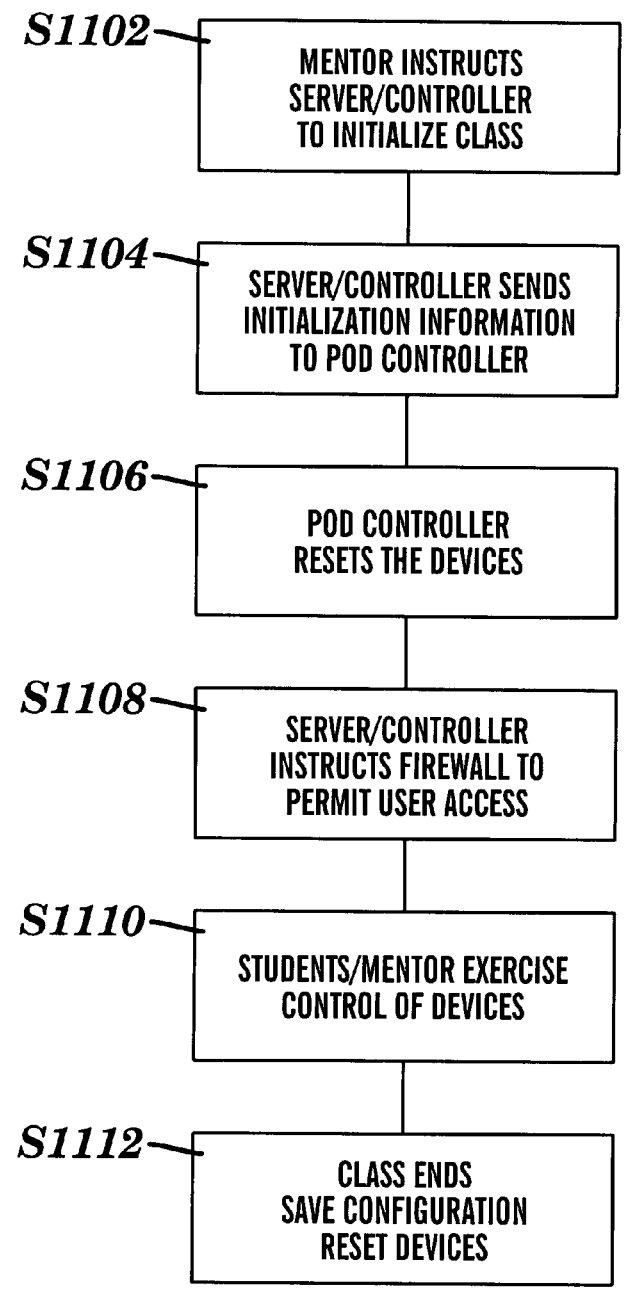
FIG. 11 provides a flow diagram for the virtual classroom, in accordance with methods and systems consistent with the invention.

FIG. 11 provides a flow diagram for the virtual classroom, consistent with the invention. An instructor initializes the class session by sending information from the instructor terminal 1012 to the server and controller 1020 (S1102). The server and controller 1020 then sends initialization information to the pod controller 1024 (S1104). The pod controller then resets the user devices 1040_1 to 1040_3 (S1106). The server and controller 1020 then instructs the firewall 1018 to permit the student terminals to access the pod controller 1024 (S1108). Through this system and mechanism students can be trained regarding controlling a user device by exercising actual control over the user devices in the pod (S1110).

After the class ends, the instructor can instruct the server and controller 1020 to save the configurations of the user devices 1040_1 to 1040_3 to allow the class to pick up where it left off at a later time. The user devices are then preferably reset to permit another class to use the user devices (S1112).

Organization of Learning Structure

Traditionally, students are taught using a learning structure that involves an instructor first lecturing or telling students about a subject, such as how to operate a device. Next, the instructor shows the students how to perform the task, and finally students are provided with a task and asked to perform it.

In an embodiment of the invention, rather than first instructing the students regarding the operation of a device, students are invited to try and perform a task regarding the device. If the student is unable to perform the task they are provided with a first level of help. This first level of help includes clues or hints regarding performing the task and top-level information. If the student needs further help, he/she is provided with a second level of information. This second level of information includes detailed information regarding performance of the task, and in one embodiment includes showing the user the exact steps to take in order to perform the task.

Figure 12:
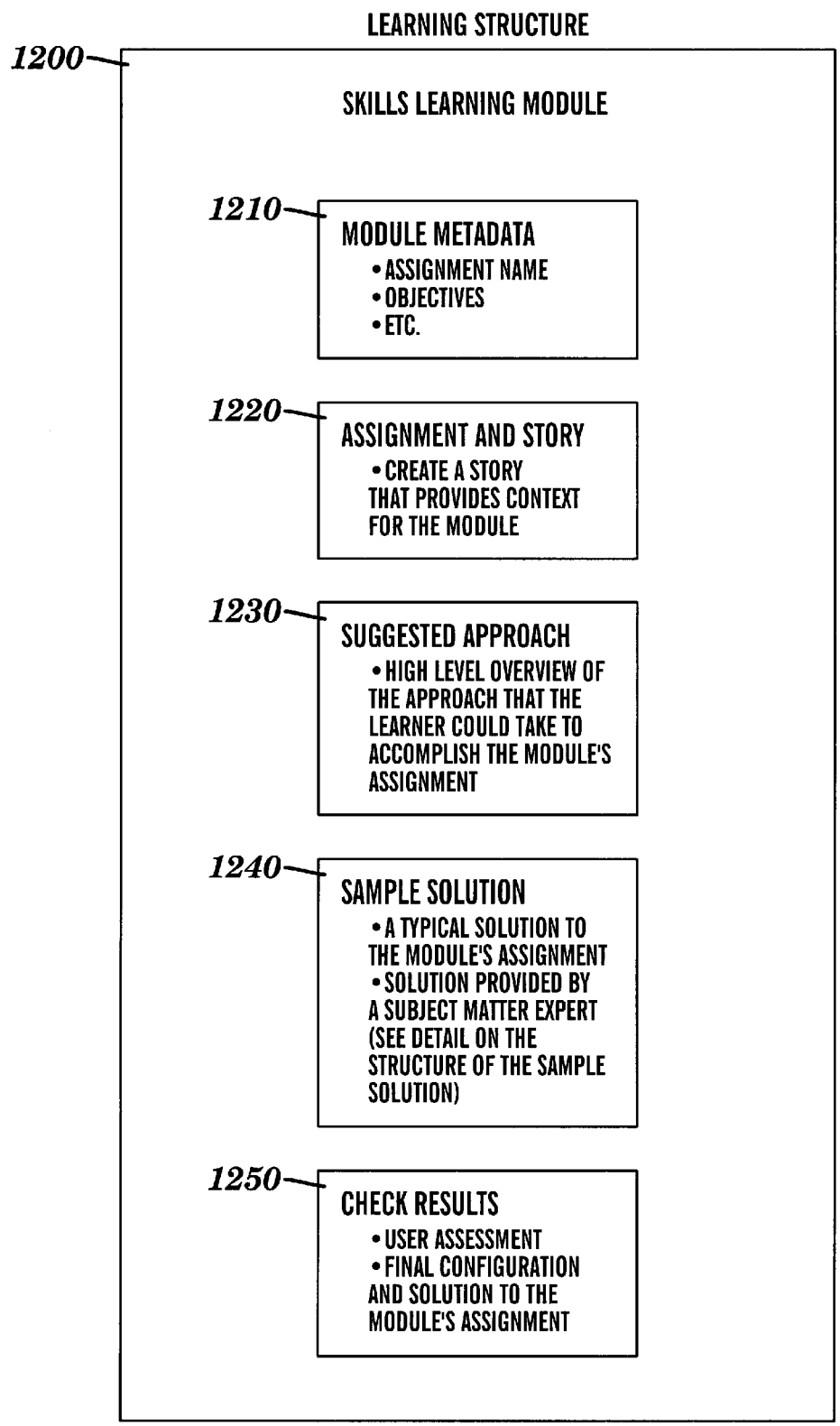
FIG. 12 illustrates a logical diagram of a skills learning module, in accordance with methods and systems consistent with the invention.

FIG. 12 illustrates a logical diagram of a skills learning module 1200 consistent with the invention. The skills learning module 1200 may include module metadata 1210, an assignment and story module 1220, a suggested approach module 1230, a sample solution module 1240, and a check results module 1250. In an embodiment, the skills learning module is stored in database 22 along with each of its sub-modules. Each of these sub-modules may be presented to a user in the form of a web page in an html format. By structuring the data in a hierarchical manner, the user may view only that information which is needed at a particular time.

Module metadata 1210 is a set of data that describes the learning module, and may include information regarding the learning environment for the module, the author of the module, the difficulty level, target audience, and other like information. For example, module metadata 1210 may include the assignment's name, its difficulty, the expected time to complete it, its authorship, and the skills or knowledge that it exercises.

Figure 13:
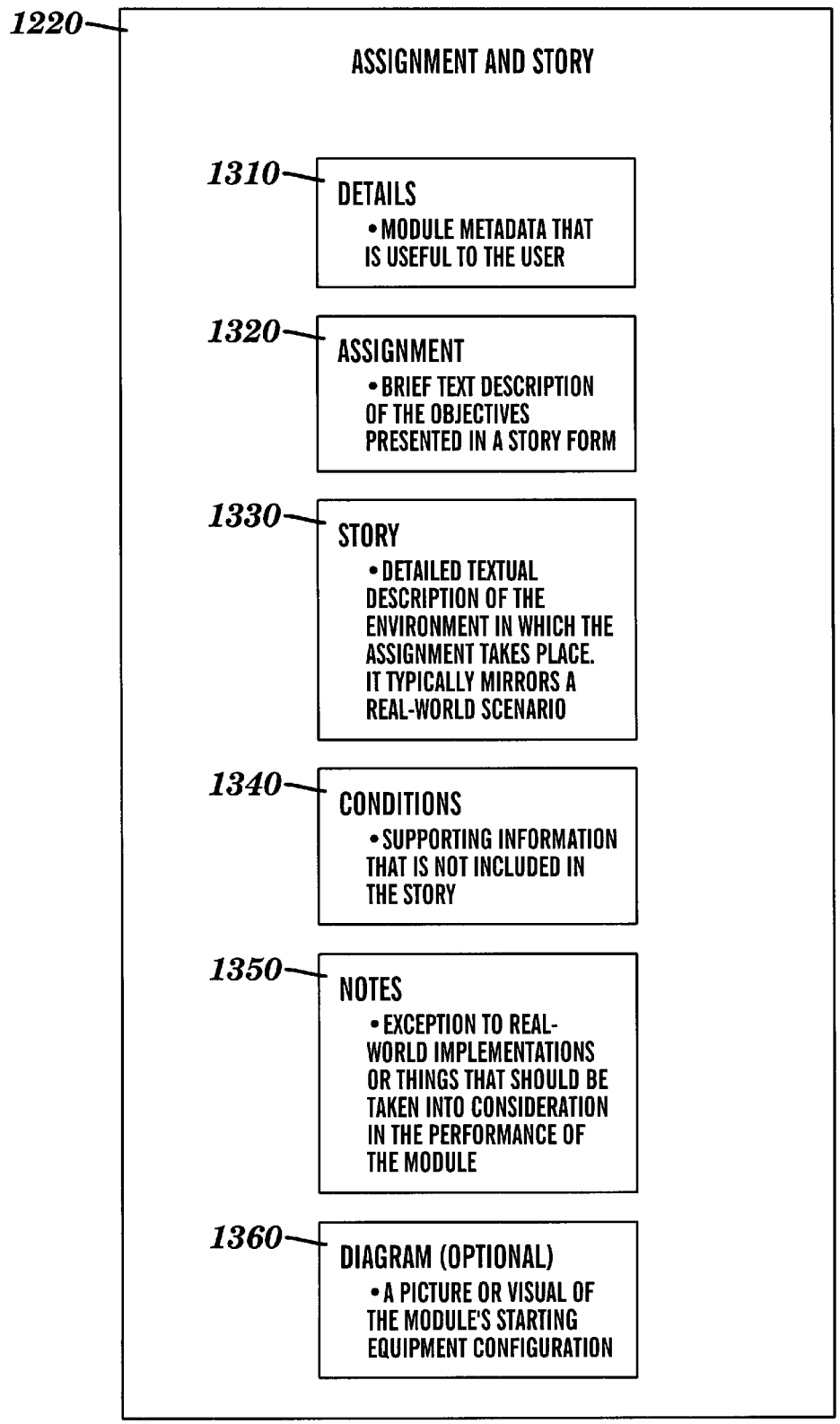
FIG. 13 provides a logical description of information that may be stored by the assignment and story sub-module, in accordance with methods and systems consistent with the invention.
Figure 14B:
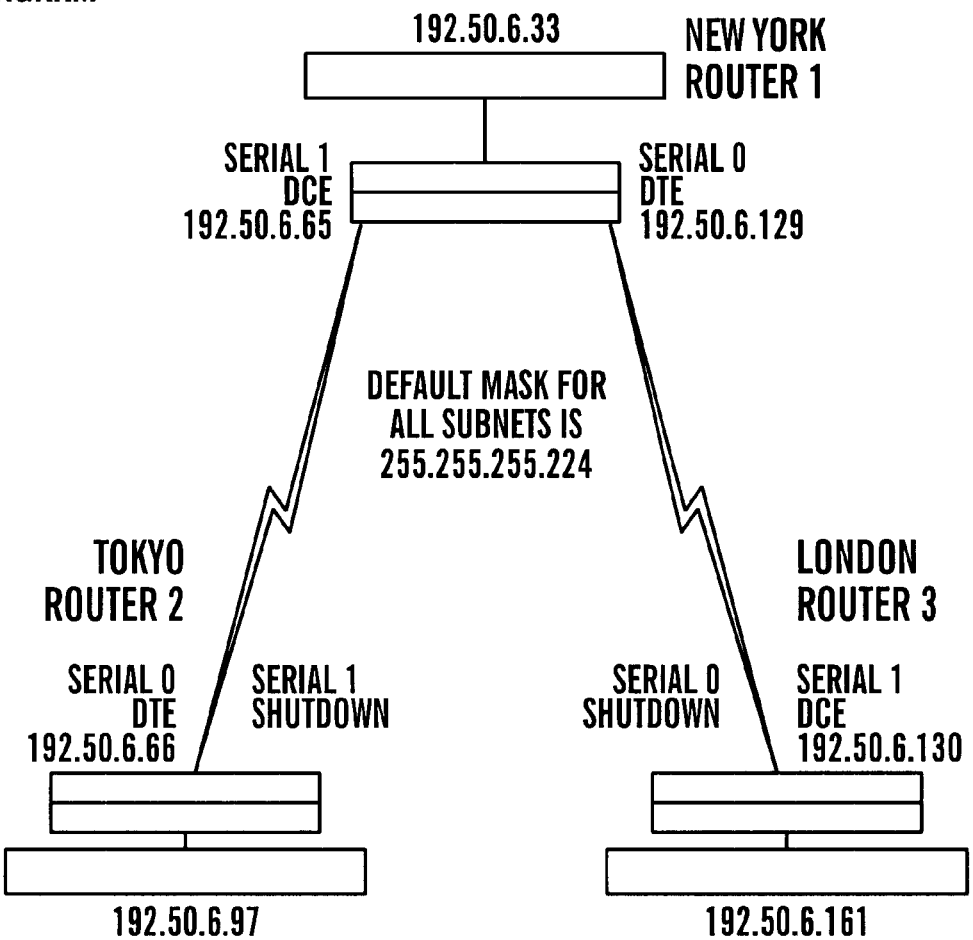
FIG. 14 illustrates an example of an assignment and story sub-module, in accordance with methods and systems consistent with the invention.

The assignment and story sub-module 1220 stores information regarding the context of an assignment so that a user may frame the learning experience in the real world. FIG. 13 provides a more detailed logical description of information that may be stored by the assignment and story sub-module 1220. As illustrated the assignment and story sub-module 1220 may include a details sub-module 1310, an assignment sub-module 1320, a story sub-module 1330, a conditions sub-module 1340, a notes sub-module 1350, and a diagram sub-module 1360. FIG. 14 illustrates an example of an assignment and story sub-module that may be presented to a user in the form of an html web page.

The details sub-module 1310 provides module metadata that is useful to the user. For example, as illustrated in FIG. 14, the details sub-module may include data regarding the title of the assignment, the technology involved, the level of difficulty, the amount of time to complete the task, the certification it may be used for, the desired learner outcome, and the desired network outcomes.

The assignment sub-module 1320 provides a brief textual description of the environment in which the assignment takes place. For example, as illustrated in FIG. 14, the assignment sub-module 1420 describes the assignment as designing an Appletalk numbering plan and enabling Appletalk routing.

The story sub-module 1330 provides a detailed textual description of the environment in which the assignment takes place. It typically mirrors a real-world scenario. For example, as illustrated in FIG. 14, the story sub-module 1430 describes the story for the assignment as: "Your network manager has told you that your network will soon have to carry Appletalk traffic. In order for this to happen you must plan an Appletalk numbering scheme and assign Appletalk zone names for each of the segments in your network. You will also enable Appletalk routing on all of the active interfaces on your routers. Once Appletalk is enabled on the routers and configured on the interfaces, you should verify that Appletalk is functioning properly."

The conditions sub-module 1340 provides supporting information. For example, as illustrated in FIG. 14, the conditions sub-module 1440 may include information such as:

"IP routing is already up and running on this network. DO NOT CHANGE ANY OF THE IP ROUTING CONFIGURATIONS.

Your Apple administrator has given you the following range of Appletalk network numbers, 2000–2999. You may use any number with that range to assign a unique Appletalk network number to each segment in the network. All of the serial links should be configured in the 'cereal zone.' You should make up unique zone names for each of the Ethernet interfaces."

The notes sub-module 1350 provides exceptions to real-world implementations or things that should be taken into consideration in the performance of the module. For example, as illustrated in FIG. 14, the notes sub-module states that the exceptions to real world conditions for this assignment are that the serial links between routers are implemented via direct connections in this lab and do not actually connect through any leased line services for the serial links.

The diagram sub-module 1360 provides a picture or visual of the module's starting equipment. For example, as illustrated in FIG. 14, the diagram sub-module 1460 illustrates three interconnected routers.

The suggested approach sub-module 1230 (FIG. 12) provides a high level description of an approach that the learner could take to accomplish the module's assignment. FIG. 15 illustrates an example of a page that provides a user with a suggested approach. As illustrated, in this example, the suggested approach is for the user to: "Figure out the Appletalk numbering plan; assign a unique Appletalk cable range to each network segment; note the Appletalk zone names on each network; enable Appletalk routing on the routers; configure the appropriate Appletalk zone names on each active router interface; then verify proper Appletalk operation using show commands."

Figure 16:
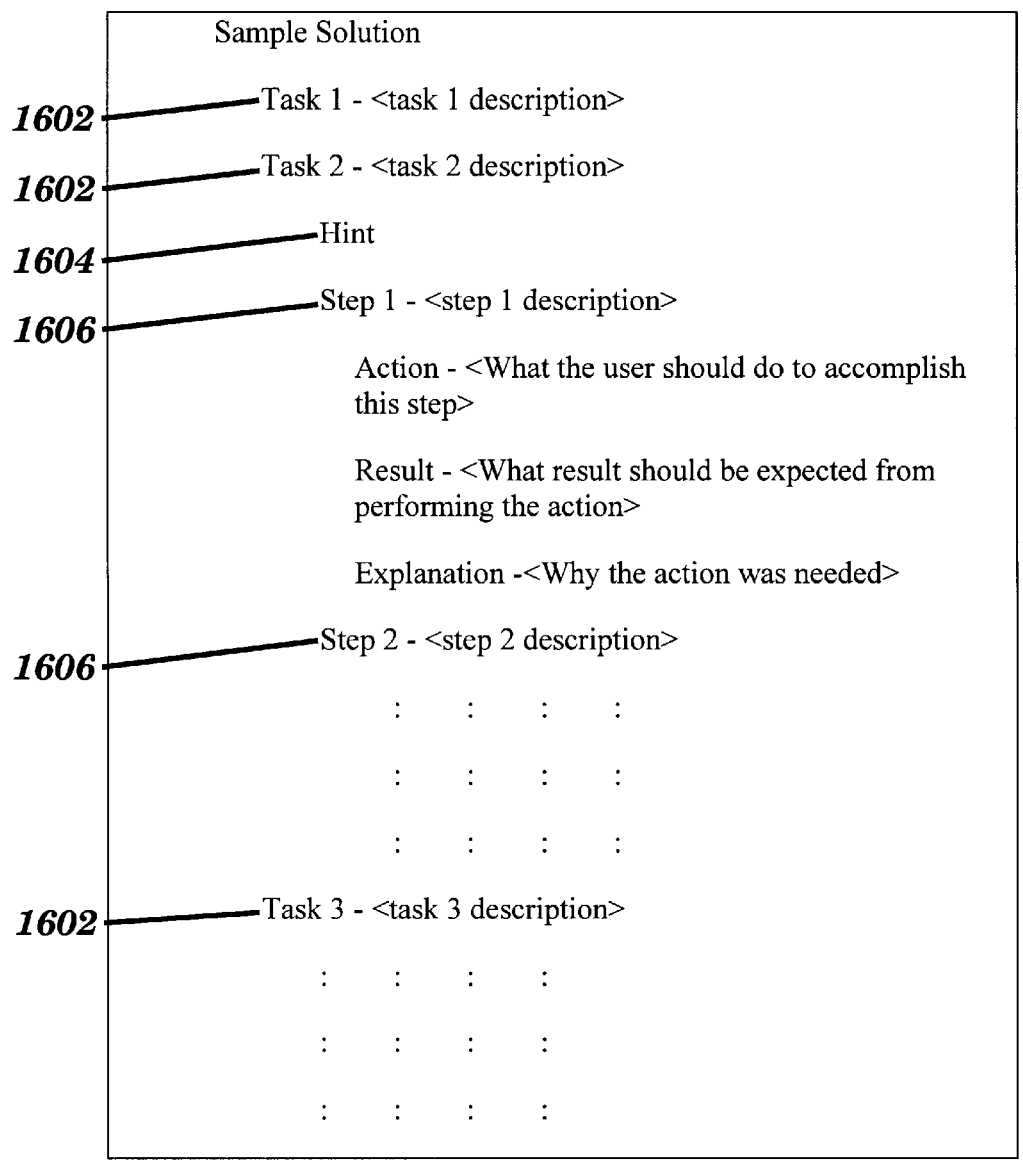
FIG. 16 illustrates a template for a page that provides a user with a sample solution, in accordance with methods and systems consistent with the invention.

The sample solution sub-module 1240 (FIG. 12) contains a subject-matter expert's solution to the module's assignment. FIG. 16 illustrates a template for a page that provides a user with a sample solution. Each solution can be broken down into a series of tasks 1602. The initial display may only show each task, along with a one-line description for the task. The user may then click on a task to expose more detailed information regarding the tasks, such as hints 1604 and steps 1606. A hint 1604 is designed to assist the user in accomplishing the tasks and is useful for users who need some initial direction on how to get started with the task, but do not need detailed information on the process. A step 1606 is a one line description that may include an action to take, the result of that action, and an explanation on why the step was necessary and the result that was achieved. In another embodiment, the sample solution may show all the details of the sample solution. FIG. 17 illustrates an example of an html page that provides such a sample solution.

The check results sub-module 1250, provides user assessment because during the course of performing a lab or course, a user may wish to check his or her final results. The user's results may be assessed in a variety of ways. For example, this assessment may be performed by examining the final configuration of the devices as compared to a final configuration produced by a subject matter expert. FIG. 18 illustrates an example of a page that provides a user with one possible set of final device configurations which can be used to compare against the results obtained by the user. In another embodiment, the check results module may provide a set of steps that the user can execute to assess his or her final configuration. For example, in a Cisco router lab, the user may be told to how to examine the routing table of a specific device and look for specific outputs. FIG. 19 illustrates an example of a page that provides a user with steps for checking their results.

Further, referring back to the example illustrated in FIG. 4, the user may select from the graphical interface illustrated to view instructions regarding the lab 412. By clicking on this link, a page is displayed to the user regarding the general instructions for performing the lab. Also shown in the example illustrated in FIG. 4 is a link to view plan 418. In this example, prior to beginning the lab, the user is presented with a series of predetermined questions designed to help the user structure his/her lab approach, thus allowing the user to plan his/her approach before beginning the lab. These questions may include, for example, questions regarding the user's plan of attack, the impact the user thinks his/her approach will have on the rest of the network and any potential trouble areas and anticipated challenges, and how he/she expects the lab to be helpful. Further, these questions may be predetermined questions or be adaptive questions that depend upon the user's answers to the questions. When the user later clicks on view plan 418, a web page is displayed to him/her that includes answers to these questions.

After a user completes a lab, in an embodiment, the user is led through a debrief question/answer section designed to reinforce the lessons taught by the lab and help the user identify ways that he/she might incorporate these skills in a production environment. The user's answers are then saved for future reference. These questions may include, for example, questions regarding how the user felt his/her plan worked out, the impact his/her approach might have had in a production environment, how he/she might change their approach, how he/she thinks his/her revised approach might work in a production environment, what he/she learned, and how the lab was helpful to him/her. Further, these questions may be predetermined questions or be adaptive questions that depend upon the user's answers to the questions.

In one embodiment, after completion of a lab, the final configurations of the user devices along with other information are archived so that the user may retrieve the information and configurations at a later time. FIG. 20 illustrates an example of a page that includes archived results after a user completes a lab where the user devices are Cisco type routers. In this figure, the data is organized such that a user may select the component of the data they wish to view while hiding the details of the other components. Thus, a user may quickly select the section of data they wish to view and ignore the other sections. For example, as illustrated, a user may select to individually view plan 2002, debrief 2004, or saved configurations 2006. By selecting plan 2002, a user may view, for example, information regarding their answers to the questions regard their plan that they had previously entered. By selecting debrief 2004, a user may view information regarding their answers to questions during a debriefing session and by selecting saved configurations 2006, a user may view the final configurations of the user devices.

Assessment

Using the above described Engine or Virtual Classroom permits assessing a user's proficiency regarding a device by assessing the user/student's control over the device.

Traditionally, students are assessed based on taking a test where they are asked questions regarding the device or control of the device. In an embodiment of the present invention, rather than simply asking a student questions regarding the device, the student is presented with a real world task regarding the control of the device. The student controls the device to perform the task. After completing the task, the student is assessed on his/her performance.

Figure 21:
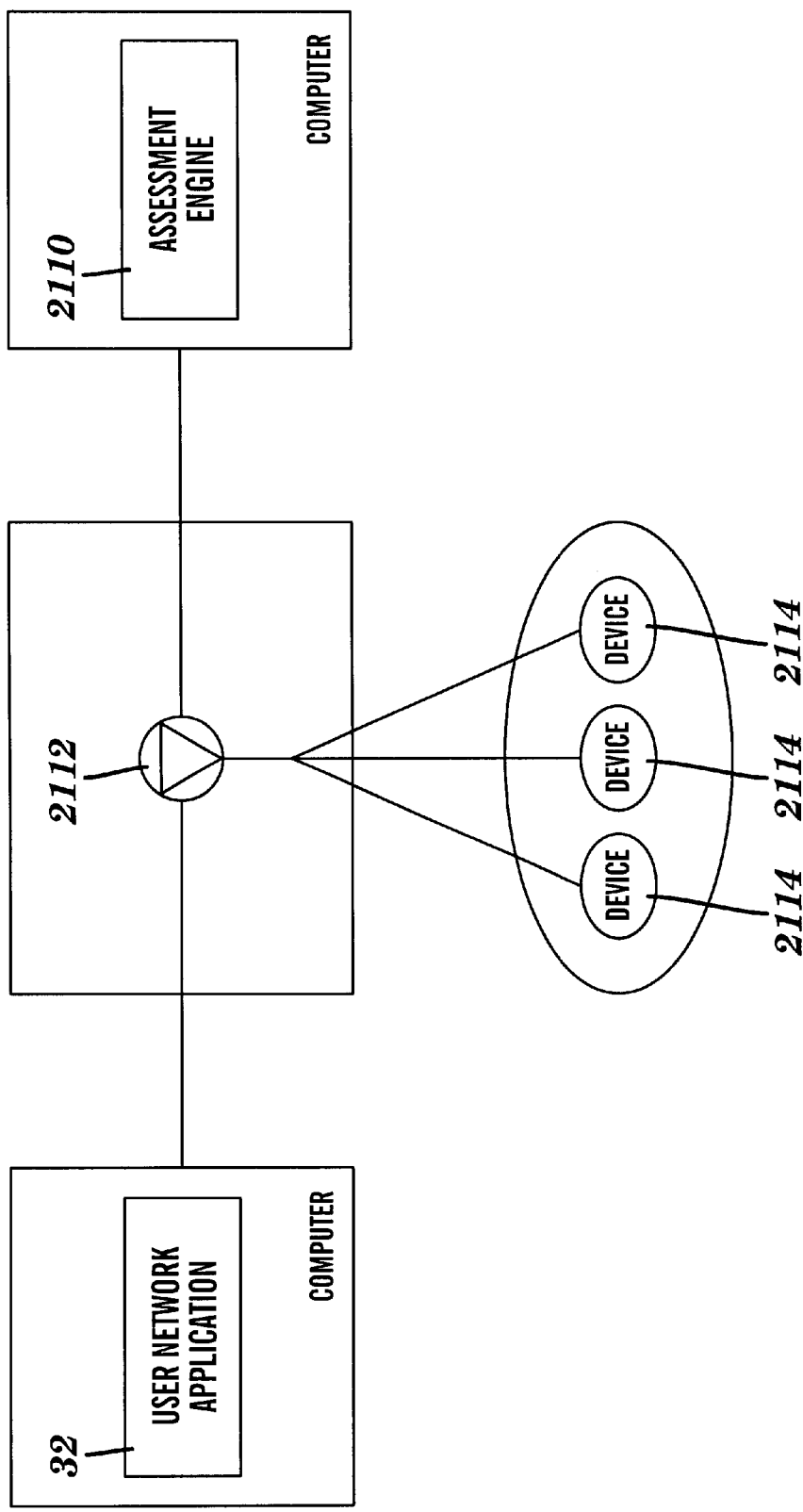
FIG. 21 provides an illustration of an assessment engine that uses a wiretap to check the configuration of the devices, in accordance with methods and systems consistent with the invention.

FIG. 21 provides an illustration of an assessment engine 2110 that uses a wiretap 2112 to check the configuration of the user devices 2114 once the assignment is completed. As with the wiretap discussed above, various configurations may be used to implement the wiretap 2112. For example, KIBITZ may be used to implement the wiretap 2112. The assessment engine 2110 may be a piece of software running on a processor or computer. Once the assignment is completed, the assessment engine 2110 may examine the configuration of the various user devices 2114 using the wiretap 2112. The assessment engine then checks this configuration against an expected configuration. It then may generate a score. Further, the assessment engine can inform the user of how their configuration differs from the expected configuration, and the potential consequences of these differences.

Figure 22:
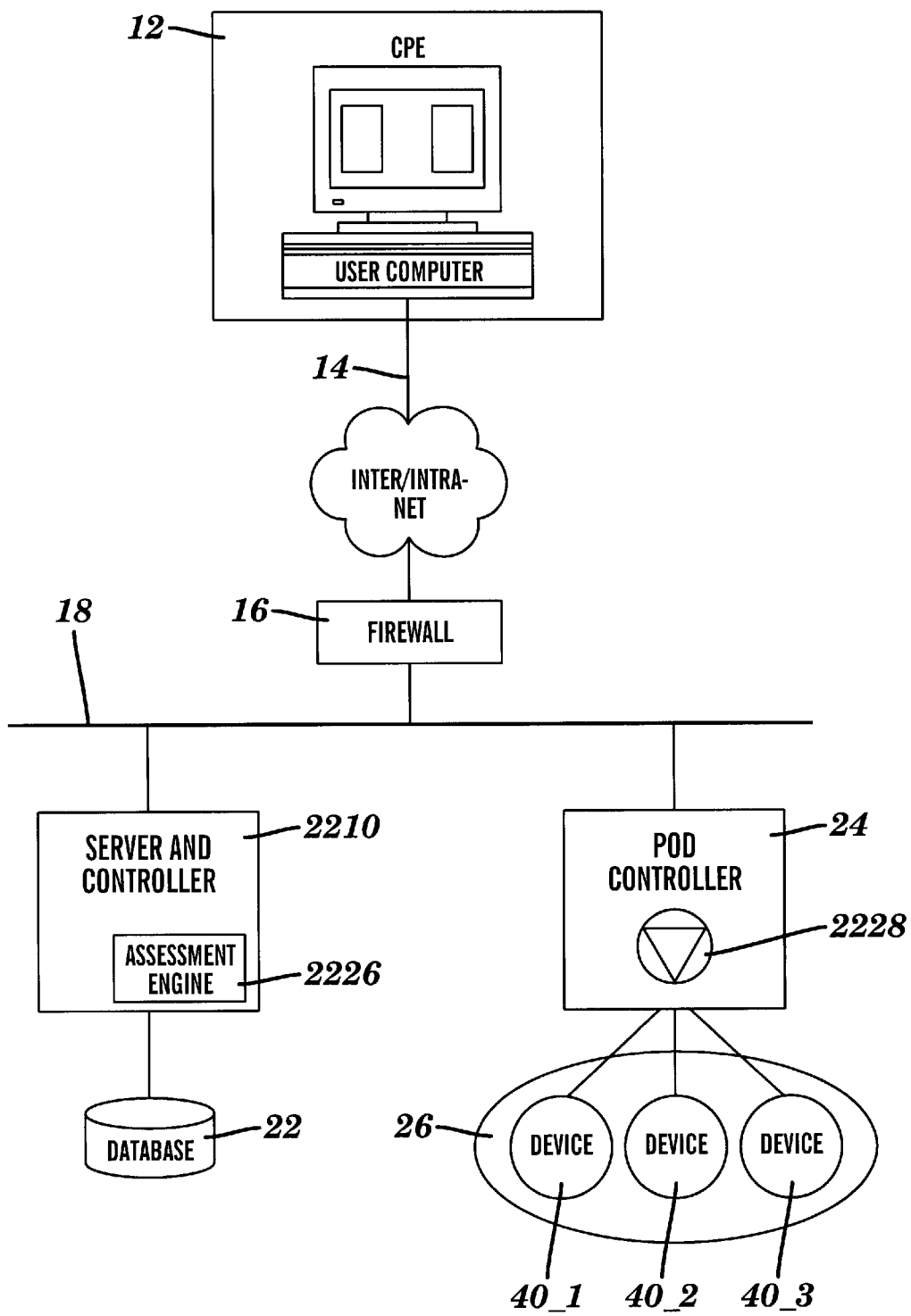
FIG. 22 illustrates an embodiment in which the server and controller contains an assessment engine, in accordance with methods and systems consistent with the invention.

FIG. 22 illustrates an embodiment in which the server and controller 2210 contains an assessment engine 2226. This assessment engine 2226 may be a piece of software running on a processor. At the completion of the assignment, the user's CPE 2212 may be disconnected from the user devices. The assessment engine 2226 then connects to the various user devices 40_1 to 40_3 through the wiretap 2228 of pod controller 24. The assessment engine 2226 then examines the configurations of the user devices 40_1 to 40_3 and compares these configurations with expected configurations. The assessment engine 2226 then may generate a score for the user, and provide him/her with feedback regarding the differences between his/her configurations and the expected configurations. Further, as will be obvious to one of skill in the art, in other embodiments, the assessment engine 2226 may connect to the various devices through a direct connection.

Further, as previously discussed in one embodiment a user may be presented with a set of steps that the user can execute to assess his or her final configuration. Referring back, FIG. 19 illustrates an example of a page that provides a user with steps for checking their results.

While it has been illustrated and described what is at present considered to be the preferred embodiment and methods of the present invention, it will be understood by those skilled in the art that various changes and modifications may be made, and equivalents may be substituted for elements thereof without departing from the true scope of the invention.

In addition, many modifications may be made to adapt a particular element, technique or, implementation to the teachings of the present invention without departing from the central scope of the invention. Therefore, it is intended that this invention not be limited to the particular embodiment and methods disclosed herein, but that the invention includes all embodiments falling within the scope of the appended claims.

What is claimed is:

1. A method for training a user, the method comprising:
receiving control information having at least one training instruction regarding at least one task to be performed as part of a training exercise;
reassigning at least one device from a second set of one or more devices to a first set of one or more devices based upon requirements of the training exercise;
managing a set of devices in the first set required to perform the training exercise; and
directing one or more of the required devices to execute the at least one training instruction.

2. The method of claim 1, wherein a system controller is connected to the client computer via the network, further comprising:
receiving exercise start information at the system controller reflecting a request from the client computer that a training exercise begin;
determining initialization information based on the exercise start information received at the system controller;
transmitting the initialization information from the system controller to the device controller; and
initializing the set of one or more devices in accordance with the initialization information.

3. The method of claim 1, wherein the network is an Internet, and wherein there is a firewall between the Internet and the device controller, further comprising: transmitting access information to the firewall in response to receiving exercise start information so that the client computer is permitted to access the set of one or more devices through the firewall.

4. The method of claim 1, wherein the network is an Internet.

5. The method of claim 1, wherein the network is an Intranet.

6. The method of claim 1, further comprising providing a result of the operation to the client computer.

7. The method of claim 1, wherein at least one of the set of one or more devices is a network device.

8. The method of claim 7, wherein the network device is a router.

9. The method of claim 7, wherein the network device is a switch.

10. The method of claim 1, wherein at least one of the set of one or more devices is a computer.

11. The method of claim 10, wherein the computer is a programmable logic controller.

12. The method of claim 1, further comprising:
the device controller transferring reset information to at least one of the devices in the set of one or more devices after completion of the training exercise so that the device may be placed in an initial state.

13. The method of claim 1, wherein the control information received at the device controller is in a first network protocol, further comprising:
the device controller translating the control information from the first network protocol to a second network protocol prior to transmitting the control information.

14. A system for training users, the system comprising:
a device controller connected to one or more client machines via a network, the device controller receiving control information from the one or more client machines, the control information having at least one training instruction regarding at least one task to be performed as part of a training exercise;
an infrastructure control module that reassigns at least one device from a second set of one or more devices to a first set of one or more devices based upon requirements of the training exercise; and
a control system that manages a set of devices in the first set required to perform the training exercise, the control system directing the one or more required devices to execute the at least one training instruction.

15. The system of claim 14, further comprising:
a system controller connected to the client computer and to the device controller that is capable of receiving exercise start information reflecting a request from the client computer that a training exercise begin, determining initialization information based on the exercise start information received, and transmitting the initialization information to the device controller for the purpose of initializing the set of one or more devices in accordance with the initialization information.

16. The system of claim 15, wherein the network is an Internet, and wherein there is
a firewall between the Internet and the device controller, wherein the system controller is further capable of transmitting access information to the firewall in response to receiving exercise start information so that the client computer is permitted to access the set of one or more devices through the firewall.

17. The system of claim 14, wherein the network is an Internet.

18. The system of claim 14, wherein the network is an Intranet.

19. The system of claim 14, wherein at least one of the devices in the set of devices is a network device.

20. The system of claim 19, wherein the network device is a router.

21. The system of claim 19, wherein the network device is a switch.

22. The system of claim 14, wherein the device is a computer.

23. The system of claim 14, wherein the computer is a programmable logic controller.

24. The system of claim 14, wherein the device controller is further capable of transferring reset information to at least one of the devices in the set of one or more devices after completion of the training exercise so that the device may be placed in an initial state.

25. The system of claim 14, wherein the control information received at the device controller is in a first network protocol, and wherein the device controller is further capable of translating the control information from the first network protocol to a second network protocol prior to transmitting the control information.

26. A system for training users, the system comprising:
a device controller including:
receiving means for receiving control information, the control information having at least one training instruction from one or more client machines regarding at least one task to be performed as part of a training exercise;
reassigning means for reassigning at least one device from a second set of one or more devices to a first set of one or more devices based upon requirements of the training exercise; and
control means for managing a set of devices in the first set required to perform the training exercise, the control means directing the one or more required devices to execute the at least one training instruction.

27. The system of claim 26, further comprising:
a system controller including:
means for receiving exercise start information reflecting a request from the client computer that a training exercise begin,
means for determining initialization information based on the exercise start information received; and
wherein the device controller further includes
means for receiving the initialization information from the system controller; and
means for initializing the set of one or more devices in accordance with the initialization information.

28. The system of claim 27, wherein the network is an Internet, and wherein there is a firewall between the Internet and the system, wherein the system controller further comprises:
means for transmitting access information to the firewall in response to receiving exercise start information so that the client computer is permitted to access the set of one or more devices through the firewall.

29. The system of claim 26, wherein the network is an Internet.

30. The system of claim 26, wherein the network is an Intranet.

31. The system of claim 26, wherein at least one of the devices in the set of devices is a network device.

32. The system of claim 31, wherein the network device is a router.

33. The system of claim 31, wherein the network device is a switch.

34. The system of claim 26, wherein at least one of the devices in the set of devices is a computer.

35. The system of claim 34, wherein the computer is a programmable logic controller.

36. The system of claim 26, wherein the device controller further includes means for transferring reset information to the device after completion of the training exercise so that the device may be placed in an initial state.

37. The system of claim 26, wherein the device controller further includes:
means for translating the control information from a first network protocol to a second network protocol prior to transmitting the control information.

38. A system comprising:
a control system that receives control information having at least one training instruction regarding at least one task to be performed as part of a training exercise, the control system managing one or more devices in a first set of one or more devices which are required to perform the training exercise, the control system directing a set of the one or more required devices to execute the at least one training instruction; and
an infrastructure control module that reassigns at least one device from a second set of one or more devices to the set of one or more required devices based upon requirements of the training exercise.

39. The system of claim 38 wherein the control system enables one or more client machines sending the control information to remotely access the set of the one or more required devices to perform the training exercise on the set of the one or more required devices.

40. The system of claim 38 further comprising a user communication module that translates the received control information morn a first network protocol understood by one or more client machines to a second protocol understood by the set of one or more required devices.

41. The system of claim 38 wherein the control system receives exercise start information from one or more client machines, the exercise start information reflecting a request from the one or more client machines that the training exercise begin, the control system determining initialization information based upon the received exercise start information, the control system initializing the set of one or more required devices in accordance with the initialization information.

42. The system of claim 41 further comprising a firewall established between a network and the control system, the control system transmitting access information through the firewall in response to receiving the exercise start information to authorize the one or more client machines to access at least one device in the set of one or more required devices.

43. The system of claim 38 wherein at least one of the devices in the set of one or more required devices is a network device, a router or a switch.

44. The system of claim 38 wherein the control system transfers reset information to at least one of the devices in the set of one or more required devices upon completing the training exercise to place the at least one device in an initial state.

45. A method comprising:
receiving control information having at least one training instruction regarding at least one task to be performed as part of a training exercise;
managing one or more devices in the first set of one or more devices which are required to perform the training exercise;
directing a set of the one or more required devices to execute the at least one training instruction; and
reassigning at least one device from a second set of one or more devices to the set of the one or more required devices based upon requirements of the training exercise.

46. The method of claim 45 further comprising enabling one or more client machines sending the control information to remotely access the set of the one or more required devices to perform the training exercise on the set of the one or more required devices.

47. The method of claim 45 further comprising translating the received control information from a first network protocol to a second network protocol.

48. The method of claim 45 further comprising:
receiving exercise start information reflecting a request from one or more client machines that the training exercise begin;
determining initialization information based upon the received exercise start information; and
initializing the set of the one or more required devices in accordance with the initialization information.

49. The method of claim 48 further comprising transmitting access information through a firewall in response to receiving the exercise start information to authorize the one or more client machines to access at least one device in the set of the one or more required devices.

50. The method of claim 45 further comprising transmitting reset information to at least one device in the set of the one or more required devices upon completion of the training exercise to place the at least one device in an initial state.

51. A computer-readable medium having stored thereon instructions, which when executed by at least one processor, causes the at least one processor to perform:

receiving control information having at least one training instruction regarding at least one task to be performed as part of a training exercise;

managing one or more devices in the first set of one or more devices which are required to perform the training exercise;

directing a set of the one or more required devices to execute the at least one training instruction; and reassigning at least one device from a second set of one or more devices to the set of the one or more required devices based upon requirements of the training exercise.

52. The medium of claim 51 further comprising enabling one or more client machines sending the control information to remotely access the set of the one or more required devices to perform the training exercise on the set of the one or more required devices.

53. The medium of claim 51 further comprising translating the received control information from a first network protocol to a second network protocol.

54. The medium of claim 51 further comprising:

receiving exercise start information reflecting a request from one or more client machines that the training exercise begin;

determining initialization information based upon the received exercise start information; and initializing the set of the one or more required devices in accordance with the initialization information.

55. The medium of claim 54 further comprising transmitting access information through a firewall in response to receiving the exercise start information to authorize one or more client machines to access at least one device in the set of the one or more required devices.

56. The medium of claim 51 further comprising transmitting reset information to at least one device in the set of the one or more required devices upon completion of the training exercise to place the at least one device in an initial state.

* * * * *